US012546894B2

(12) United States Patent
Greenberg et al.

(10) Patent No.: US 12,546,894 B2
(45) Date of Patent: Feb. 10, 2026

(54) NON-CONTIGUOUS 3D LIDAR IMAGING OF TARGETS WITH COMPLEX MOTION

(71) Applicant: Raytheon Company, Arlington, VA (US)

(72) Inventors: Adam Hodge Greenberg, Gardenia, CA (US); Eran Marcus, Culver City, CA (US)

(73) Assignee: Raytheon Company, Arlington, VA (US)

( * ) Notice: Subject to any disclaimer, the term of this patent is extended or adjusted under 35 U.S.C. 154(b) by 1012 days.

(21) Appl. No.: 17/643,511

(22) Filed: Dec. 9, 2021

(65) Prior Publication Data

US 2023/0184950 A1 Jun. 15, 2023

(51) Int. Cl.

| | |
|---|---|
| ***G01S 17/89*** | (2020.01) |
| ***G01S 7/481*** | (2006.01) |
| ***G01S 17/58*** | (2006.01) |
| ***G06T 15/08*** | (2011.01) |

(52) U.S. Cl.

CPC ............ *G01S 17/89* (2013.01); *G01S 7/4814* (2013.01); *G01S 17/58* (2013.01); *G06T 15/08* (2013.01)

(58) Field of Classification Search

CPC ...... G01S 17/42; G01S 17/4814; G01S 17/58; G01S 7/4808; G01S 17/89; G06T 15/08

See application file for complete search history.

(56) References Cited

U.S. PATENT DOCUMENTS

| | | | |
|---|---|---|---|
| 8,948,497 | B2 | 2/2015 | Sebastian et al. |
| 9,858,304 | B2 | 1/2018 | Marcus et al. |
| 10,371,818 | B2 | 8/2019 | Marcus et al. |
| 10,620,315 | B2 | 4/2020 | Zellinger et al. |
| 2014/0064555 | A1 | 3/2014 | Sebastian et al. |

(Continued)

FOREIGN PATENT DOCUMENTS

| | | | |
|---|---|---|---|
| WO | WO 2018/071416 | A1 | 4/2018 |
| WO | WO-2023107320 | A1 | 6/2023 |

OTHER PUBLICATIONS

PCT International Search Report and Written Opinion dated Mar. 20, 2023 for International Application No. PCT/US2022/051489; 15 Pages.

(Continued)

*Primary Examiner* — An H Do

(74) *Attorney, Agent, or Firm* — Schwegman Lundberg & Woessner, P.A.

(57) ABSTRACT

A plurality of scattered laser pulses is received, each scattered laser pulse associated with at least one plurality of respective dwells. A set of 3D velocity information is received, which is derived from photo events detected in information associated with the received plurality of scattered laser pulses. Each dwell in the plurality of dwells is associated with one or more photo events. The 3D velocity information includes information estimating each respective photo event's respective position in 6D space during the respective dwell associated with the photo event. For each dwell, its respective photo events are projected into a common reference frame, determined based on the 3D velocity information, to generate a set of motion-compensated point clouds. Each respective motion-compensated point cloud, for each dwell, is registered to the other motion-compensated point clouds in the set, to generate a set of registered point clouds, which are merged into a volumetric image.

17 Claims, 21 Drawing Sheets

(56) References Cited

U.S. PATENT DOCUMENTS

| | | | |
|---|---|---|---|
| 2018/0299556 A1 | 10/2018 | Marcus et al. |
| 2020/0371240 A1 | 11/2020 | Newman et al. |
| 2021/0341606 A1 | 11/2021 | Greenberg et al. |
| 2021/0341607 A1 | 11/2021 | Greenberg et al. |
| 2022/0206152 A1 | 6/2022 | Greenberg et al. |

OTHER PUBLICATIONS

Halmos et al., "Photon Counting Ladar;" Journal of Physics; Published Jan. 2011; 5 Pages.

Jack et al., "Advances in LADAR Components and Subsystems at Raytheon;" SPIE Defense Security and Sensors, Session #8353-77; Apr. 2012; 18 Pages.

MathWorks, "pcregistericp;" Article Retrieved on Nov. 10, 2021 from https://www.mathworks.com/help/vision/ref/pcregistericp.html; 8 Pages.

White et al., "Evaluating the Capacity of Single Photon Lidar for Terrain Characterization Under a Range of Forest Conditions;" Journal of Remote Sensing of Environment, No. 252; Accepted Oct. 27, 2020; 17 Pages.

"International Application Serial No. PCT/US2022/051489, International Preliminary Report on Patentability mailed Jun. 20, 2024", 11 pgs.

targets.coords

| | 1 | 2 | 3 |
|---|---|---|---|
| 1 | 1 | 1533161 | 1522 |
| 2 | 1 | 1533133 | 1522 |
| 3 | 1 | 1533131 | 1522 |
| 4 | 1 | 1533162 | 1522 |
| ⋮ | | | |
| 354 | 2 | 1534117 | 1523 |
| 355 | 2 | 1527115 | 1516 |
| 356 | 2 | 1524043 | 1513 |
| 357 | 2 | 1480906 | 1470 |

Target ID # — PE pointer — Pulse pointer

460

*FIG. 4B* targets.pos6ds

| | 1 | 2 | 3 | 4 | 5 | 6 |
|---|---|---|---|---|---|---|
| 1 | 6.8594e+03 | -21.9423 | -4.9913 | 144.5621 | 93.1492 | -90.7813 |
| 2 | 6.8402e+03 | -13.7350 | 8.0330 | 149.7559 | -7.4796 | -142.2547 |

Target #1 → row 1; Target #2 → row 2

R pos. — X pos. — Y pos. — R vel. — X vel. — Y vel.

NON-CONTIGUOUS 3D LIDAR IMAGING OF TARGETS WITH COMPLEX MOTION

STATEMENT REGARDING FEDERALLY SPONSORED RESEARCH

Certain embodiments described herein were made with Government support. The U.S. Government may have certain rights in certain embodiments described herein.

FIELD

Embodiments of the disclosure generally relate to devices, systems, and methods for signal processing associated with LADAR systems. More particularly, the disclosure describes embodiments relating to devices, systems, and methods that use LADAR imaging for constructing three dimensional images of targets having complex and unknown motion.

BACKGROUND

LADAR (laser detection and ranging) involves a technology that uses light, typically laser technology, to measure distances (range), speed, at least some atmospheric parameters, can also capture high resolution imaging information, and can locate and characterize targets. In some instances, the term "LiDAR" can be more used in applications relating to mapping terrain or collecting information about the atmosphere, whereas "LADAR" can be used more in applications relating to locating and characterizing smaller point targets like vehicles or other manufactured objects, but this is not limiting. Either way, it is the same basic technology, only the type of target being 'ranged' is different. In the present application, any use of the term "LADAR" is intended also to encompass "LiDAR," as will be understood.

LADAR operates in a manner not unlike radar but beams of laser light are used instead of radio waves. In particular, LADAR generally uses ultraviolet, visible, or near infrared light to image objects or terrains. A LADAR system measures distances to objects/terrain by illuminating the objects with light and measuring the reflected pulses with a sensor. A laser is one example of a light source that can be used in a LADAR/LiDAR system. Using a narrow laser beam, for example, a LADAR/LiDAR system can detect physical features of objects with extremely high resolutions. A LADAR can generate point clouds of a desired region in the environment. Thus, LADAR has been used to create high resolution survey maps of geographic areas and detailed three-dimensional (3-D) images of objects.

LADAR also can be used to characterize moving targets and range to targets. For example, pulsed LADAR systems provide an active sensing system that can determine the range to a target by measuring the time of flight ("ToF") of short laser pulses reflected off the target. LADAR systems may be used to characterize a moving target, e.g., a target moving toward or away from the LADAR system, and also to capture high-resolution imaging information about moving and stationary targets. More recently, LADAR has been implemented to support control and navigation of various types of obstacle avoidance systems, such as autonomous, intelligent vehicle systems (e.g., driverless and/or self-driving vehicles) and active collision avoidance systems in vehicles with drivers. The safety and success of autonomous vehicles depends at least in part on their ability to accurately map and respond to their surroundings in real time. Further, an accurate perception of moving and stationary objects, and also of motion of moving objects, can be important for successful operation of active collision avoidance systems as well autonomous vehicle systems.

SUMMARY

The following presents a simplified summary in order to provide a basic understanding of one or more aspects of the embodiments described herein. This summary is not an extensive overview of all of the possible embodiments and is neither intended to identify key or critical elements of the embodiments, nor to delineate the scope thereof. Rather, the primary purpose of the summary is to present some concepts of the embodiments described herein in a simplified form as a prelude to the more detailed description that is presented later.

The processing methods used to generate a high-resolution image using some types of LADAR systems may have various shortcomings. For example, multi-dwell imaging of static scenes is a common feature of LADAR systems used for wide-area mapping. These systems register data from disparate "looks" (also referred to herein as "dwells") at the area of interest, to correct for navigation and pointing knowledge errors. However, such systems cannot account for in-scene motion between dwells, so in some instances, all non-static content is smeared and/or lost in the merged product, when a final image is generated. Many radar and other systems use motion compensation techniques to undo the effects of within-dwell motion to increase signal to noise ratio (SNR) for target detection and avoid smear in image formation. However, these motion compensation approaches are valid only for measurements made over the course of a single contiguous dwell. In many cases, they are also limited to systems capable of coherent sensing.

At least some embodiments herein attempt to address at least some of these limitations. For example, at least some embodiments herein combine the advantages of both methods (multi-dwell imaging and motion compensation) for the application of imaging dynamic targets with direct-detect LADAR systems. Certain embodiments herein adapt and add to a single-dwell acquisition algorithm disclosed in commonly assigned U.S. patent application Ser. No. 17/138,386, entitled "SIX DIMENSIONAL TRACKING OF SPARSE LADAR DATA" (hereinafter "'386 application") and filed on Dec. 30, 2020, which shares two inventors in common with the present application, which application is hereby incorporated by reference. This application also references and incorporates by reference a 4D target tracker described in another copending and commonly assigned U.S. patent application Ser. No. 17/138,365, entitled "VIDEO TRACKING OF SPARSE GEIGER-MODE DATA" and filed on Dec. 30, 2020, which shares one inventor in common with the present application, (hereinafter "'365 application"), which application is hereby incorporated by reference.

In certain embodiments herein, motion-compensated target returns (e.g., motion-compensated point clouds) are extracted from each individual dwell then, these motion-compensated point clouds are corrected for rigid translation and orientation errors via dwell-to-dwell registration to generate higher-quality multi-look imagery. That is, registering each respective motion-compensated point cloud is configured to correct at least one of translation and orientation errors.

In a first aspect, a system is provided, comprising a receiver and a processor. The receiver is configured to receive a plurality of scattered laser pulses, each respective scattered laser pulse in the plurality of scattered laser pulses associated with at least one respective dwell. The processor is configured for: receiving a set of three-dimensional (3D) velocity information derived from photo events detected in information associated with the received plurality of scattered laser pulses, wherein each dwell in the plurality of dwells is associated with one or more respective photo events, and wherein the 3D velocity information comprises information estimating each respective photo event's respective position in six-dimensional (6D) space during the respective dwell associated with the respective photo event; projecting, for each dwell, the respective photo events of the dwell into a common reference frame, wherein the common reference frame is determined based on the 3D velocity information, to generate a set of motion-compensated point clouds, the set of motion-compensated point clouds comprising at least one motion-compensated point cloud for at least one respective dwell; registering each respective motion-compensated point cloud, for each dwell, to the other motion-compensated point clouds in the set of motion-compensated point clouds, to generate a set of registered point clouds; and merging the set of registered point clouds into a volumetric image.

In some embodiments, the processor is further configured for: computing, for the volumetric image, a local spatial point density; and applying a non-linear scaling to the local spatial point density to form a scaled volumetric image. In some embodiments, the processor is further configured for displaying the scaled volumetric image. In some embodiments, the plurality of dwells is noncontiguous. In some embodiments, the plurality of dwells is separated in time. In some embodiments, wherein the set of 3D velocity information is generated using a state space carving (SSC) process.

In some embodiments, wherein the plurality of scattered pulses is associated with a single photon laser detection and ranging (LADAR) (SPL) system. In some embodiments, the scattered laser pulses and detected photo events are associated with a target and wherein the common reference frame comprises an instantaneous reference frame that is associated with the target and which is based on the set of 3D velocity information. In some embodiments, the target associated with the plurality of scattered laser pulses, has smoothly differentiable motion.

In some embodiments, the processor is configured for registering each respective motion-compensated point cloud to correct at least one of translation and orientation errors, in at least a portion of the set of motion-compensated point clouds. In some embodiments, the processor is configured for registering each respective motion-compensated point cloud using an iterative closest point (ICP) algorithm.

In another aspect, a method is provided. A plurality of scattered laser pulses is received, each respective scattered laser pulse in the plurality of scattered laser pulses associated with at least one plurality of respective dwells. A set of three-dimensional (3D) velocity information is received, the set of 3D velocity information derived from photo events detected in information associated with the received plurality of scattered laser pulses, wherein each respective dwell in the plurality of dwells is associated with one or more respective photo events, and wherein the 3D velocity information comprises information estimating each respective photo event's respective position in six-dimensional (6D) space during the respective dwell associated with the respective photo event. For each dwell, its respective photo events are projected into a common reference frame, wherein the common reference frame is determined based on the 3D velocity information, to generate a set of motion-compensated point clouds, the set of motion-compensated point clouds comprising at least one motion-compensated point cloud for at least one respective dwell. Each respective motion-compensated point cloud, for each dwell, is registered to the other motion-compensated point clouds in the set of motion-compensated point clouds, to generate a set of registered point clouds. The set of registered point clouds are merged into a volumetric image.

In some embodiments, the method further comprises displaying the volumetric image as a scaled volumetric image. In some embodiments, the method further comprises generating the set of 3D velocity information using a state space carving (SSC) process. In some embodiments, the scattered laser pulses and detected photo events are associated with a target and wherein the common reference frame comprises an instantaneous reference frame that is associated with the target and which is based on the set of 3D velocity information. In some embodiments, the registering each respective motion-compensated point cloud is configured to correct at least one of translation and orientation errors, in at least a portion of the set of motion-compensated point clouds.

In another aspect, a means for laser detection is provided, comprising: means for receiving a plurality of scattered laser pulses, means for receiving a set of three-dimensional (3D) velocity information derived from photo events detected in information associated with the received plurality of scattered laser pulses, means for projecting, for each dwell, the respective photo events for the dwell into a common reference frame, means for registering each respective motion-compensated point cloud, for each dwell, to the other motion-compensated point clouds in the set of motion-compensated point clouds, to generate a set of registered point clouds, and means for merging the set of registered point clouds into a volumetric image.

In the means for receiving the plurality of scattered laser pulses, each respective scattered laser pulse in the plurality of scattered laser pulses is associated with at least one plurality of respective dwells. In the means for receiving a set of 3D velocity information, each dwell in the plurality of dwells is associated with one or more respective photo events, and wherein the 3D velocity information comprises information estimating each respective photo event's respective position in six-dimensional (6D) space during the respective dwell associated with the respective photo event. In the means for projecting, for each dwell, the respective photo events of the dwell into a common reference frame, the common reference frame is determined based on the 3D velocity information, to generate a set of motion-compensated point clouds, the set of motion-compensated point clouds comprising at least one motion-compensated point cloud for at least one respective dwell.

In some embodiments, the means for laser detection of claim further comprises means for generating the set of 3D velocity information using a state space carving (SSC) process. In some embodiments, the scattered laser pulses and detected photo events are associated with a target and the common reference frame comprises an instantaneous reference frame that is associated with the target and which is based on the set of 3D velocity information. In some embodiments, the registering each respective motion-compensated point cloud is configured to correct at least one of translation and orientation errors, in at least a portion of the set of motion-compensated point clouds.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the claims included herein.

Details relating to these and other embodiments are described more fully herein.

BRIEF DESCRIPTION OF THE DRAWINGS

The advantages and aspects of the described embodiments, as well as the embodiments themselves, will be more fully understood in conjunction with the following detailed description and accompanying drawings, in which:

FIG. 4B is a first table showing raw photo events and pulses associated with two exemplary targets, as generated by the SSC method of FIG. 4A, in accordance with one embodiment FIG. 4C is a second table showing the 6D state space positions of the two targets of FIG. 4B, as generated using the SSC method of FIG. 4A, in accordance with one embodiment;

The drawings are not to scale, emphasis instead being on illustrating the principles and features of the disclosed embodiments. In addition, in the drawings, like reference numbers indicate like elements.

DETAILED DESCRIPTION

Figure 1:
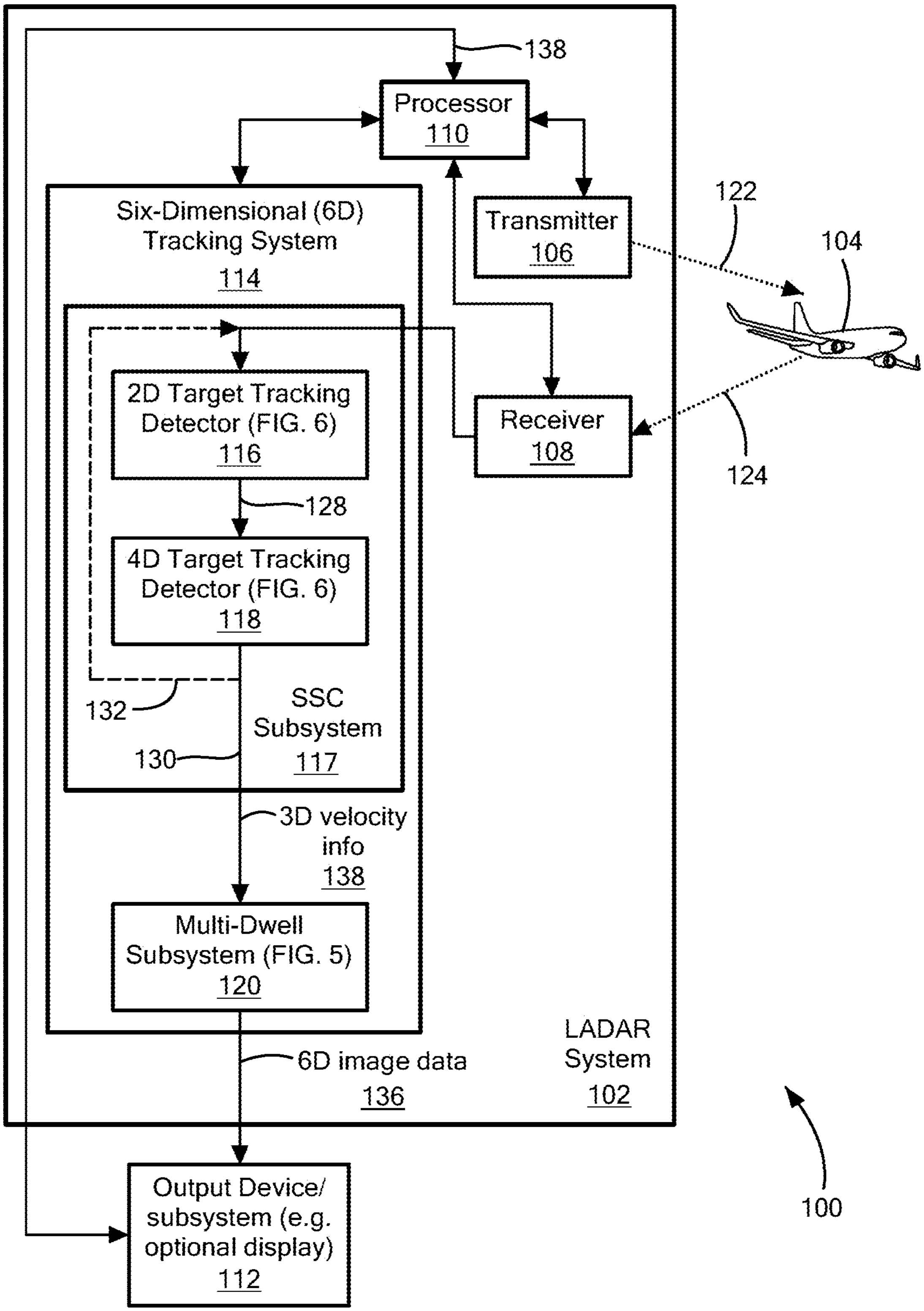
FIG. 1 is a block diagram of a LADAR system, in accordance with one embodiment.

The following detailed description is provided, in at least some examples, using the specific context of LADAR systems target detection systems configured to detect, track, monitor, and/or identify terrain and/or targets, where targets can include (but are not limited to) aircraft (both unmanned and manned), unmanned aerial vehicles, unmanned autonomous vehicles, robots, ships, spacecraft, automotive vehicles, and astronomical bodies, or even birds, insects, and rain. At least some embodiments herein are usable with any systems involved with any radar applications, including but not limited to military radars, air traffic control radars, weather monitoring radars, etc.

Unless specifically stated otherwise, those of skill in the art will appreciate that, throughout the present detailed description, discussions utilizing terms such as "opening", "configuring," "receiving,", "detecting," "retrieving," "converting", "providing,", "storing," "checking", "uploading", "sending,", "determining", "reading", "loading", "overriding", "writing", "creating", "including", "generating", "associating", and "arranging", and the like, refer to the actions and processes of a computer system or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The disclosed embodiments are also well suited to the use of other computer systems such as, for example, optical and mechanical computers. Additionally, it should be understood that in the embodiments disclosed herein, one or more of the steps can be performed manually.

Before describing in detail the particular improved systems, devices, and methods, it should be observed that the concepts disclosed herein include but are not limited to a novel structural combination of components and circuits, and not necessarily to the particular detailed configurations thereof. Accordingly, the structure, methods, functions, control and arrangement of components and circuits have, for the most part, been illustrated in the drawings by readily understandable and simplified block representations and schematic diagrams, in order not to obscure the disclosure with structural details which will be readily apparent to those skilled in the art having the benefit of the description herein.

The following description includes several terms for which the definitions are generally known in the art. However, the following glossary definitions are provided to clarify the subsequent description and may be helpful in understanding the specification and claims.

"Point Cloud" at least includes a set of data points in 3-D space, which together represent a 3-D shape or object. Each point in the data set of a point cloud, in certain embodiments, is represented by an x, y, and z geometric coordinate. Point clouds provide a way to assemble a large number of single spatial measurements into a dataset that can be represented as a describable object. Point cloud processing is used in various applications, including LADAR/LIDAR, robot navigation and perception, depth estimation, stereo vision, visual registration, in advanced driver assistance systems (ADAS) and autonomous navigation systems.

"LADAR system" (also known in the art as LIDAR system; the terms LADAR and LiDAR are used interchangeably herein) broadly includes at least any system that can determine values of parameters indicative of a distance between a pair of tangible objects, or the depth of a region within a tangible object, whether or not either of the objects in the pair is moving, based on reflected light. The tangible objects can be any type of entity or thing that light can reflect off of, whether fixed or movable, solid or liquid, including but not limited to humans, animals, reptiles, birds, vehicles (including those traveling on land, in the air, in space, and in or on water), water and other liquids, both in solid and liquid form, buildings, structures, plants, inanimate objects (whether natural or man-made), objects under automated and/or remote control, and/or objects under control of a person. In at least some embodiments, at least some of the LADAR systems and methods described herein are configured to determine or construct a high signal to noise ratio (SNR) three-dimensional (3D) image of a target, where the target has unknown and possibly complex motion. At least some embodiments herein relate to LADAR systems and method capable of determining a distance between a pair of tangible objects, determine a direction of travel of one or more tangible objects, and/or determine a velocity of one or more tangible objects, based on reflections of light emitted by the LADAR system, where the direction, range, and/or velocity determinations can be absolute or relative and can broadly include generating outputs which are indicative of at least one or more of distances between pairs of tangible objects, velocity of one or more tangible objects, and/or acceleration of one more tangible objects (including negative acceleration).

"Light source" at least refers to any device configured to emit light, including but not limited to lasers such as gas lasers, laser diodes, solid-state lasers, high power lasers, and the light can be emitted in many different spatial and temporal formats, including but not limited to pulses (including short and long pulses having detectable rise and fall times), sequences of pulses in the form of one or more dwells, bursts, organized point clouds, random spatial patterns, etc. In some embodiments, the emitted light is at a wavelength between about 650 nm and 1150 nm. Alternatively, the light source may include a laser diode configured to emit light at a wavelength between about 850 nm and about 1050 nm (NIR), or between about 1300 nm and about 1600 nm (SWIR).

"Time of Flight," (ToF) at least refers at least to a period of time between the emission of a light signal (also referred to herein as a light beam or photons) from a light source, the light beam striking the tangible object, and its return for detection by the sensor in a receiver system. In some embodiments, the sensors of the LADAR system convert the received signal into temporal information indicative of ToF. For example, by using known information (such as the speed of light in the medium of travel, e.g., air), the ToF information is processed to generate information about a distance the light signal traveled between emission and detection.

"Single Photon LADAR" (SPL) (also known in the art as "single photon counting LADAR," "photon counting detector," "single photon detector," "single photon avalanche diode (SPAD)-based pulsed LADAR,") refers at least to types of LADAR that are capable of measuring/detecting light down to the smallest physically possible increment: a photon. Note that SPL systems are not necessarily only capable of detecting a single photon, but they can at least be capable detecting a single photon. "Geiger-mode LiDAR," (also referred to in the art as "Geiger mode detectors" are a subset of single photon detectors and are explicitly only capable of detecting a single photon at a time. As will be appreciated, there are various types of single-photon detection technologies. SPL, in accordance with at least some embodiments herein, at least refers to a form of LADAR that uses detectors that require only one detected photon per ranging measurement, as opposed to hundreds or thousands of detected photons per ranging measurement for conventional linear mode airborne LADARs. That is, SPL is capable of detecting/measuring the ToF of individual photons. Single Photon Lidar (SPL) provides a high-density point cloud that can be acquired from a high altitudes. Known linear-mode-LADAR (LML) systems can record multiple returns (commonly 5 returns per pulse) of energy for each laser pulse (although the number of photons required to trigger a return can be proprietary to the instrument being used to process returns); in some LML system, hundreds or thousands of photons may be required to trigger a return in order to reduce the impact of noise. In sharp contrast, in an SPL system, a single photon can trigger a return at the sensor for an SPL system. Thus, SPL can provide an efficient approach to rapid, high-resolution 3D mapping in terms of swath, spatial resolution, acquisition time and density of range returns. SPL has emerged as an optimal for depth imaging through challenging environments, especially when high point densities are required over very large areas, or when improvements in measurement rates can significantly reduce data acquisition costs. For example, SPL has been used in such challenging scenarios as imaging though highly scattering underwater conditions, free-space imaging through obscurants such as smoke, forest cover, and/or fog, and depth imaging of complex multiple surface scenes. With SPL, the point density on the ground can be 10-100 times higher for SPL data than that obtained with multi-photon systems at the same flight altitude, which can help to reduce operation costs. In addition, the long-range capabilities (kilometers), excellent depth resolution (centimeters), and use of low-power (eye-safe) laser sources renders SPL a strong candidate for use in applications such as autonomous vehicles. Certain embodiments herein advantageously use SPL. Commonly assigned U.S. Pat. No. 9,335,414 ("FREQUENCY AGILE LADAR"), which is hereby incorporated by reference, describes an illustrative single photon counting LADAR system that can be adapted to be usable with at least some embodiments herein.

Turning now to the drawings, in which like reference characters indicate corresponding elements throughout the several views, attention is first directed to FIG. 1, which is a block diagram 100 of an exemplary LADAR system 102, in accordance with one embodiment, which is configured to address at least some of the aforementioned shortcomings. The exemplary LADAR system 102 is usable to construct a three dimensional (3D) image of a target 104 (which is shown for illustrative purposes only to be an aircraft but this is not limiting), wherein in some embodiments the 3D image is generated based at least in part on 3D velocity information derived from photo events (e.g., one or more photo events) detected in a plurality of scattered laser pulses received at the receiver 108, or in information associated with one or more photo events, and is usable to provide that 3D image to be displayed as a scaled volumetric image on any type of an output device 112, where the output device 112 can be another processing system, another entity (which can be a program, machine, and/or human), a display or other device viewable by a user, etc. In some embodiments, the output device 112 can be part of exemplary LADAR system 102 itself. The 3D velocity information, in some embodiments, includes information estimating each photo event's position in six-dimensional (6D) space during its respective dwell. The exemplary LIDAR system 102 includes four subsystem: a laser transmitter 106, a receiver 108 (e.g., an optical receiver), a processor 110, and a six-dimensional (6D) tracking system 114 (which can be implemented entirely by the processor 110, as will be understood.

The laser transmitter 106 is configured to generate generating laser pulses 122 (e.g., pulses of photons/light pulses 122) when commanded (e.g., by processor 110), and to direct these pulses 122 in a desired direction (e.g., the direction of the target 104). In certain embodiments, one characteristic of these pulses is that they are each 1-25 nanoseconds in duration, so that the resulting range measurement may be accurate to within a few meters. In some embodiments, the laser transmitter 106 is configured to transmit pulses 122 at a desired pulse repetition frequency (e.g., 20 kHz).

The receiver 108, in certain embodiments, includes an optical system (not shown, but well understood in the art) capable of collecting reflected light 124 (which includes light returns that arrive in response to transmitted laser pulses) from the target 104, and a photodetector (not shown, but well understood in the art) within the receiver 108, which is capable of recording the arrival time of incoming light (e.g., reflected light 124), as will be understood in the art. The photodetector is capable of timing the arrival of return pulses with an accuracy similar in scale to the laser pulse duration. In some embodiments, the receiver 108 includes elements such as a focal plane array (not shown) which may be arranged to receive scattered laser pulses, as will be understood in the art. The receiver 108, in cooperation with the processor 110, converts the reflected light 124 into data 126 that it provides to the 6D tracking system 114.

Figure 10:
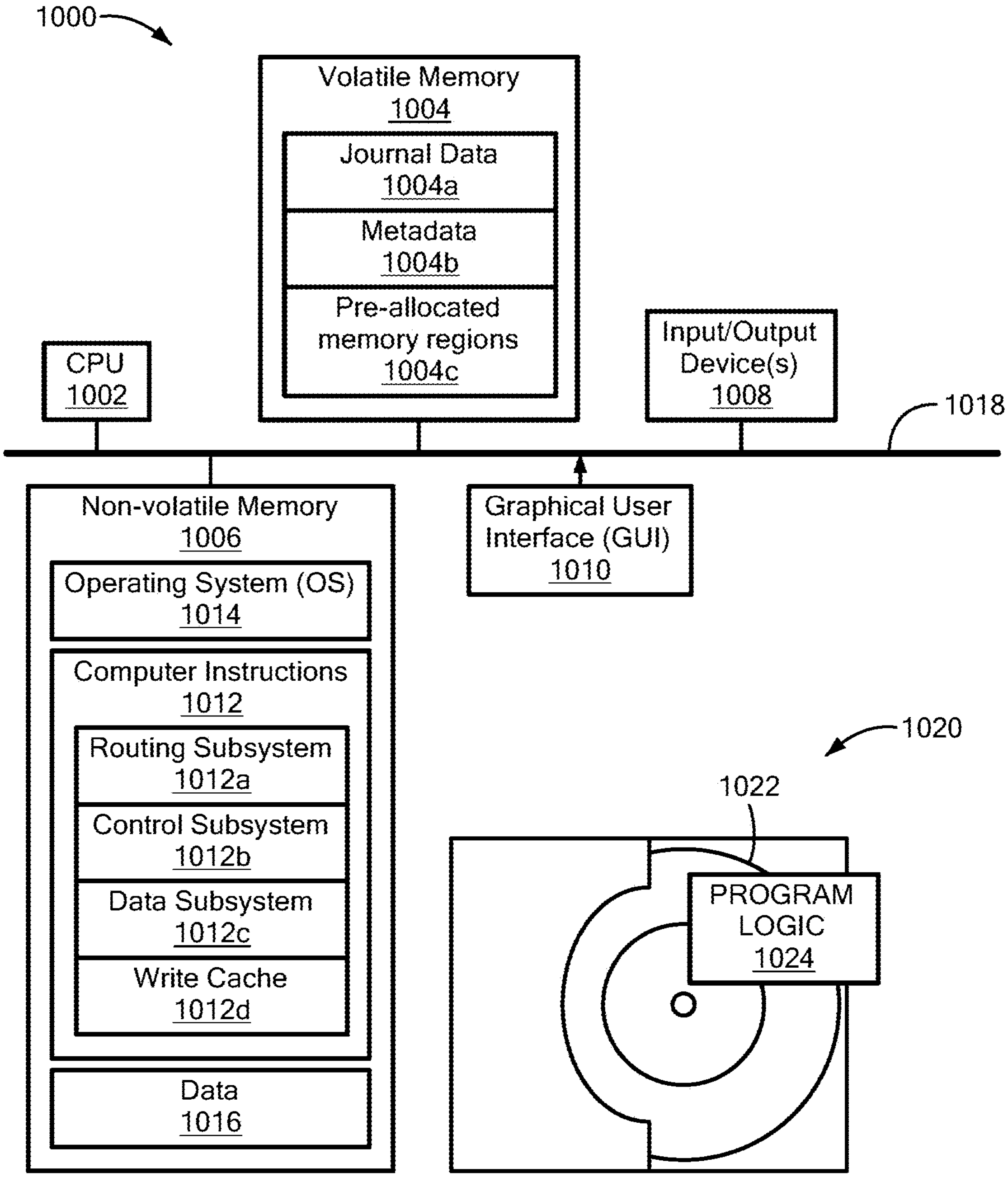
FIG. 10 is a block diagram of an exemplary computer system usable with at least some of the systems and apparatuses of FIGS. 1-9B, in accordance with one embodiment.

The processor 110 can be any type of computing device capable of controlling the operation of the laser transmitter 106 and receiver 108, and to concurrently (e.g., simultaneously) extract video/photo information about the target 104 from the detections made by the receiver 108, such as range and range rate of the target 104, based on the transmit and return times ("time of flight") of the photons 122 and reflected light 124. In certain embodiments, the processor 110 is configured to implements the 6D tracking system 114, described further herein, to perform processing on the data 126 (which can include video data, such as video input data) from receiver 108, such as extracted video/photo information. In certain embodiments, a computer system, such as that shown and described further herein in connection with FIG. 10, is usable to implement the processor 110.

The processor 110, in certain embodiments, also is configured to synchronize commands issued to the laser transmitter 106 and the receiver 108. In certain embodiments, an essential aspect of the return processing of the returns of reflected light 124 received at receiver 108 is the ability to determine target characteristics accurately despite complex scattering of the transmitted light pulses 122 imperfect detection of the reflected light 124, unwanted detections due to ambient light and electrical noise, modulation of the return due to motion of the target 104, and complex and unknown motion of the target 104, among other practical complications. In certain embodiments, the 6D tracking system 114 assists in the determination of one or more characteristics of the target 104. In certain embodiments, a multi-dwell process (described further below) helps to produce a high signal to noise ratio (SNR) 3D image of the target 104, in the presence of complect and unknown motion of the target 104. This is described further herein.

The 6D tracking system 114, in some embodiments, includes a state space carving (SSC) subsystem 117 and a multi dwell subsystem 120, each of which are explained further herein. The SSC subsystem, in certain embodiments, incorporates an SSC method which is more particularly explained in the aforementioned '386 patent. The SSC subsystem 117, described further herein, include a 2D target tracking detector subsystem 116 (which includes a 2D target tracking detector) and 4D target tracking detector subsystem 118. The SSC subsystem 117 shown in FIG. 1 is but one illustration of a type of system that can produce the required 3D velocity outputs 136, and it is envisioned that other systems capable of producing the same types of outputs based on the received data 126, are usable, as explained further herein. For example, an acquisition and motion estimation algorithm subsystem could be adapted by those of skill in the art to produce the same outputs described herein for the SSC subsystem 117, such as tagged photo events that are assigned a position in 3D space.

Figure 2:
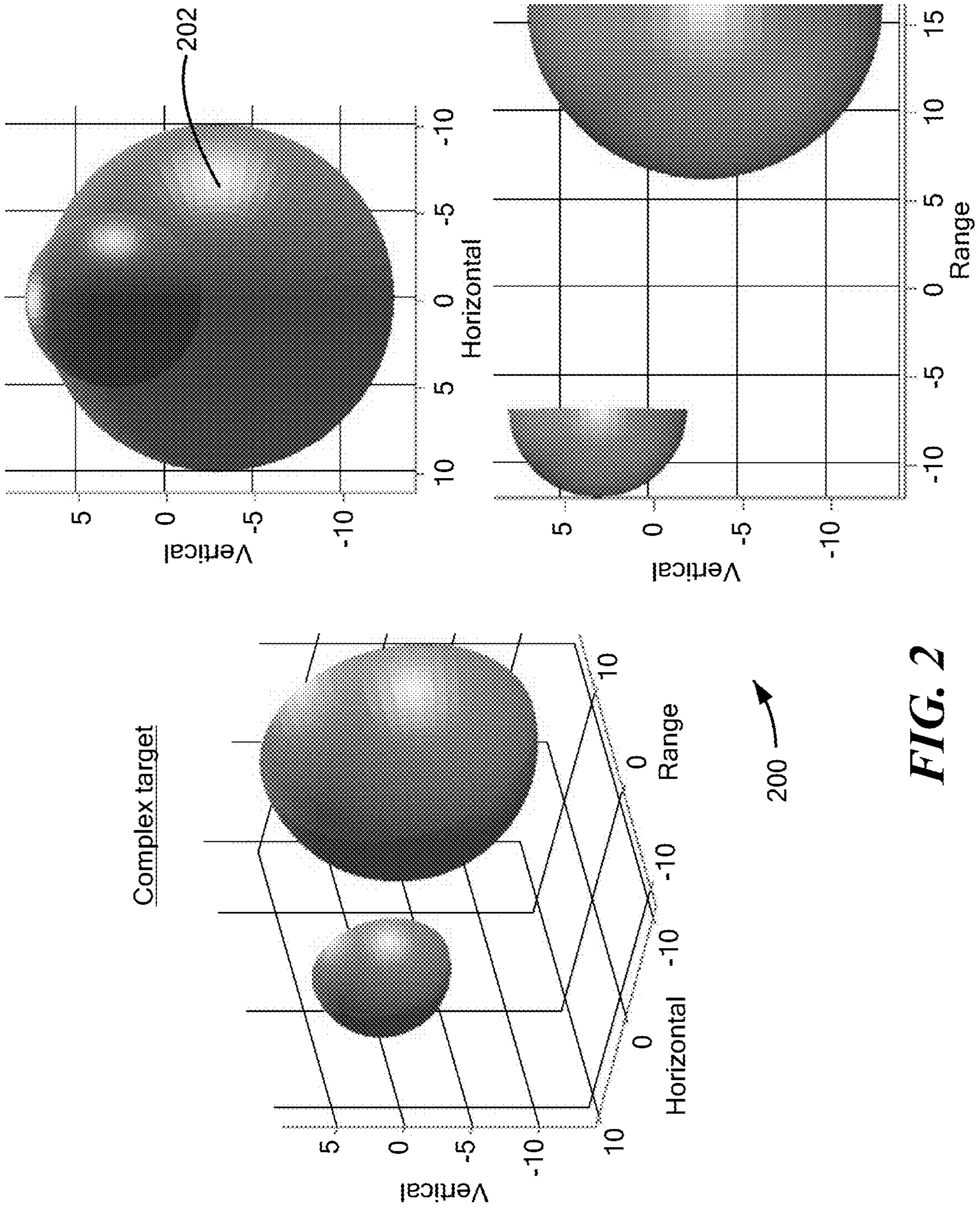
FIG. 2 is an exemplary model of a target with complex motion, in accordance with one embodiment.
Figure 3:
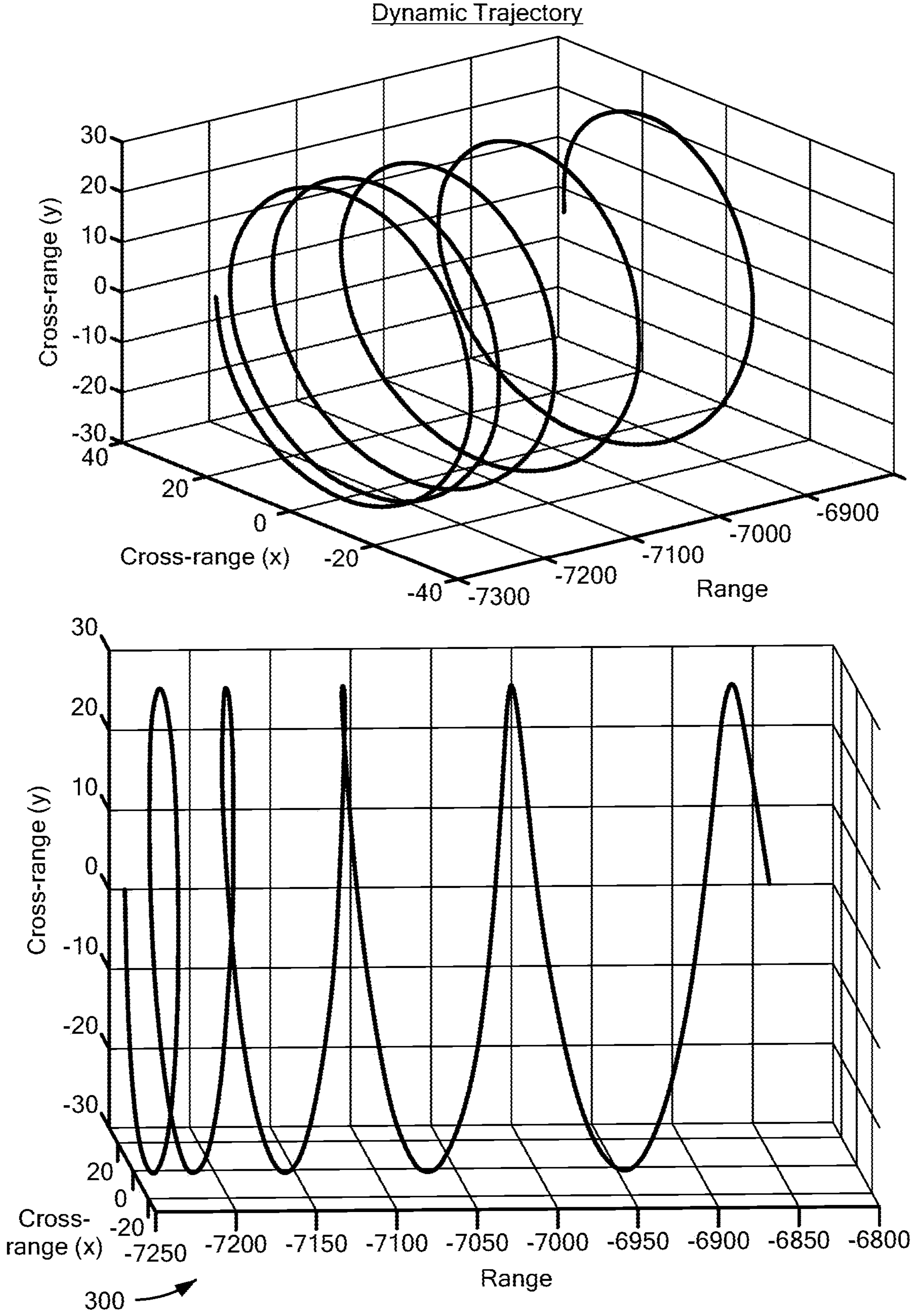
FIG. 3 is an exemplary model of a trajectory of the target of FIG. 2, which trajectory is unknown a priori, in accordance with one embodiment.

To help understand applicability of the embodiments described herein, it is useful to first consider the situation of a complex target model having a dynamic 3D trajectory, with complicated motion. FIG. 2 is an exemplary model 100 of a complex target 202 with complex motion, in accordance with one embodiment, and FIG. 3 is an exemplary model of a trajectory 300 of the complex target 202 of FIG. 2, which trajectory 300 is unknown a priori, in accordance with one embodiment. The complex target 202 of FIG. 2 is an occluding bi-sphere complex (center figure, labeled as complex target 202), with an exemplary front-and-back component laser radar scattering cross section (LRCS) ratio of 3-to-1. As shown in FIG. 3, the trajectory 300 of the complex target 202 (which is not known in advance) is a spiraling and accelerating helix, as shown in FIG. 3. The total signal-to-noise ratio is extremely low, with ~350 total signal events and ~850,000 background events per 150 ms dwell. Note that with this SNR, the complex target 202 would be undetectable with conventional 2D processing (e.g., shift and sum (SAS) maps).

The aforementioned '386 and '365 applications provided further details (which are also summarized herein) on several techniques that are able to detect lower-SNR targets than was previously possible. In certain embodiments herein, additional techniques are provided to provide further ways to detect low SNR targets, especially those having complex and unknown motion, and some of these embodiments leverage, apply, and adapt the techniques of the aforementioned '386 and '365 applications, as part of the embodiments. In certain embodiments herein, the techniques of the aforementioned '386 and '365 patent applications are not necessary, and alternate techniques are employed.

In certain embodiments herein, a technique of multi-dwell processing is provided to enable non-contiguous 3D LADAR imaging of targets with complex motion. Some of these embodiments use the aforementioned SSC method of the '386 patent, to help provide 3D velocity information for the multi dwell processing. SSC, in certain embodiments, achieves better detection statistics by iteratively projecting raw LADAR data across two orthogonal sub-spaces of the full 6D state-space—first into 2D (R, $\dot{R}$) (i.e., range, range-rate), then 4D (az (azimuth), el (elevation), az-dot (azimuth rate), el-dot (elevation rate), also referred to by the respective characters $\phi$, $\theta$, $\dot{\phi}$, $\dot{\theta}$)).

Figure 6:
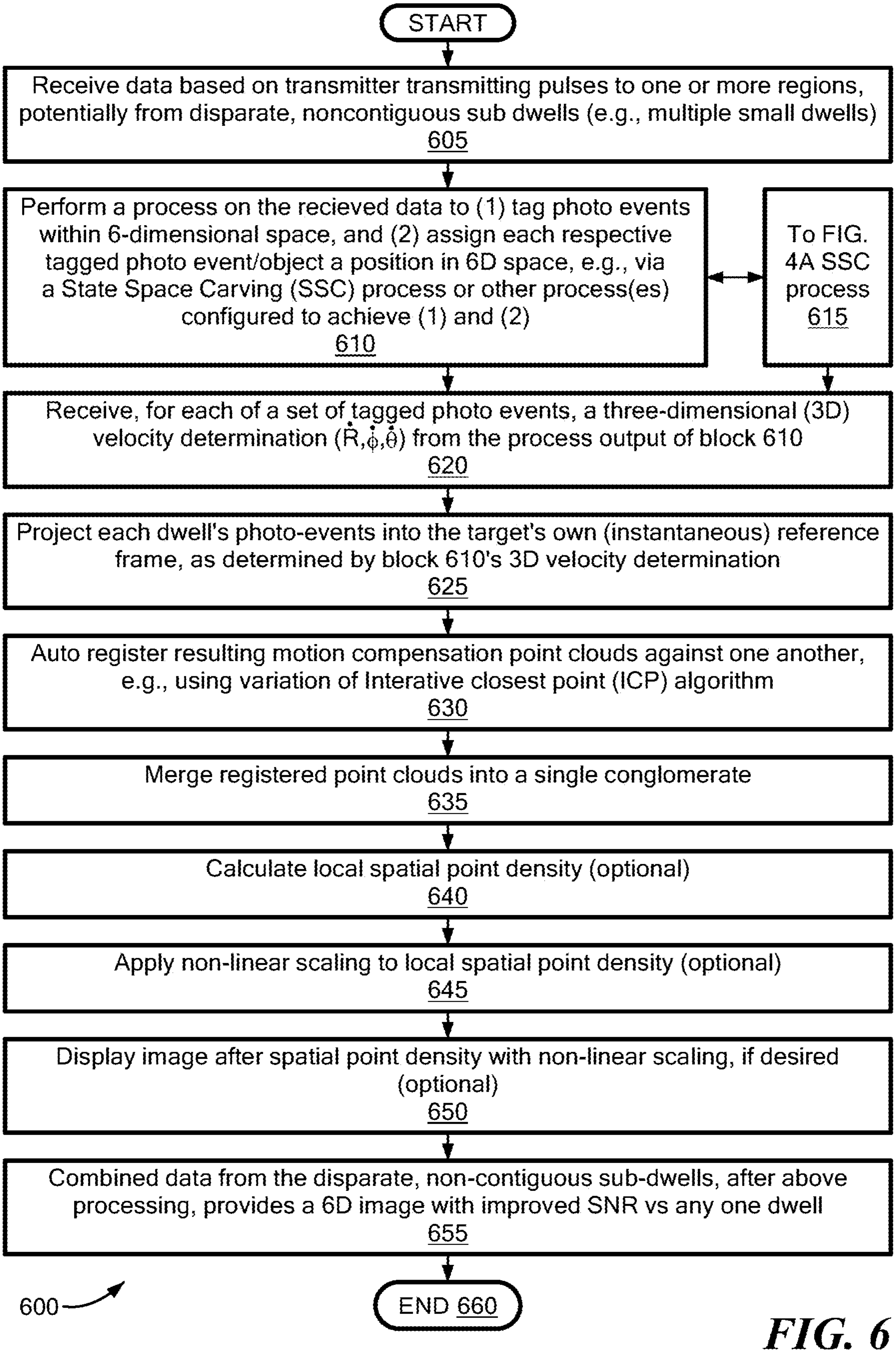
FIG. 6 is a flowchart illustrating a method that operates in the system of FIG. 1 and in accordance with the block diagrams of FIGS. 4A and 5A-5B.

To further the understanding of the embodiment herein, FIG. 4 is a flowchart showing further details of an exemplary state space carving (SSC) process 400 usable as part of one of the processing blocks in the flowchart of FIG. 6 (discussed further herein), in accordance one embodiment. The SSC process 400 of FIG. 4, as described further below, is able to detect lower-SNR targets than was previously possible. Within each subspace, statistically significant clusters of events are tagged and retained, while all other events are discarded. Stochastic variation can cause background events to randomly cluster in either space, thereby masquerading as signal—but due to the orthogonality of the two subspaces, it is unlikely for such a false cluster to be retained through a full SSC iteration. As a result, the SSC process of FIG. 4A "carves" away background as it iterates. Rigid-body targets, on the other hand, are compact across all six dimensions of state, and therefore signal photo-events are retained throughout the carving process Referring to FIGS. 1 and 4A, at block 405, the receiver 108 provides video input data 126 to the 6D tracking system 114, where the video input data includes target photo events and background photo events, where the video data 126 may be derived from a LADAR dwell of a target and the target surroundings. Video data 126 may be derived from received or scattered laser pulses, the laser pulses transmitted by the laser transmitter 106 or the like. In certain embodiments, the video data 126 may include sparse and binary video data such as Geiger-Mode Avalanche Photodiode data (GMAPD). In certain embodiments, the video data is as a result of a single photon detector that is capable of detecting individual photons in a laser transmission.

In certain implementations, the 2D target tracking detector 116 may thereafter receive video data 126, so that the 2D target tracking detector 116 can transform the photo events into a 2D target tracking array including range and range rate($R$, $\dot{R}$) parameters (block 410). The 2D target tracking detector 116 may be operated by use of processor 110 or by an external exemplary computer system (not shown), similar to that of FIG. 10. The 2D target tracking detector 116 may be configured to concurrently determine the range and the range-rate (i.e., velocity) of photo events within video data 126 based on transmissions of laser pulses 122 and received reflected light 124 such as return times of photons. Henceforth, the terms speed, velocity, and range-rate refer to the velocity of the target 104 relative to the exemplary LADAR system 102 along the range axis (i.e., the line/direction connecting the exemplary LADAR system 101 and the target 104). The 2D target tracking detector 116 may accurately determine these target 104 characteristics despite complex scattering of the transmitted light, imperfect detection of the returns, unwanted detections due to ambient light and electrical noise, modulation of the return due to target motion, and/or other practical complications and limitations.

In some implementations, the 2D target tracking detector 116 scales (e.g., stretches or compresses) the transmit times of emitted laser pulses 122 according to a plurality of hypothesized and/or predicted velocities and, for each hypothesized velocity, computes a cross-correlation of the scaled transit times with the return times of detection events, and identifies the peak cross-correlation power value for the plurality of hypothesized/trial velocities. Determining the temporal scaling that yields the highest correlation peak value allows the 2D target tracking detector 116 to concurrently (e.g., simultaneously) determine both the range and range-rate of photo events. An example 2D target tracking detector that determines both the range and range-rate of photo events is described in commonly assigned U.S. Pat. No. 1,152,592 (inventors Greenberg & Marcus, which is the same as the present application) entitled "SYSTEM AND METHOD FOR DETERMINING RANGE-RATE AND RANGE EXTENT OF A TARGET," issued on Dec. 13, 2022 (hereinafter "'064 application"). The content of the '064 application, particularly the content related to the process of target acquisition (e.g., FIG. 3 of U.S. Pat. No. 11,525,922 and the accompanying description), is incorporated herein by reference. However, it will be understood by those of skill in the art that other 2D target tracking detectors are, of course, usable.

Figure 4A:
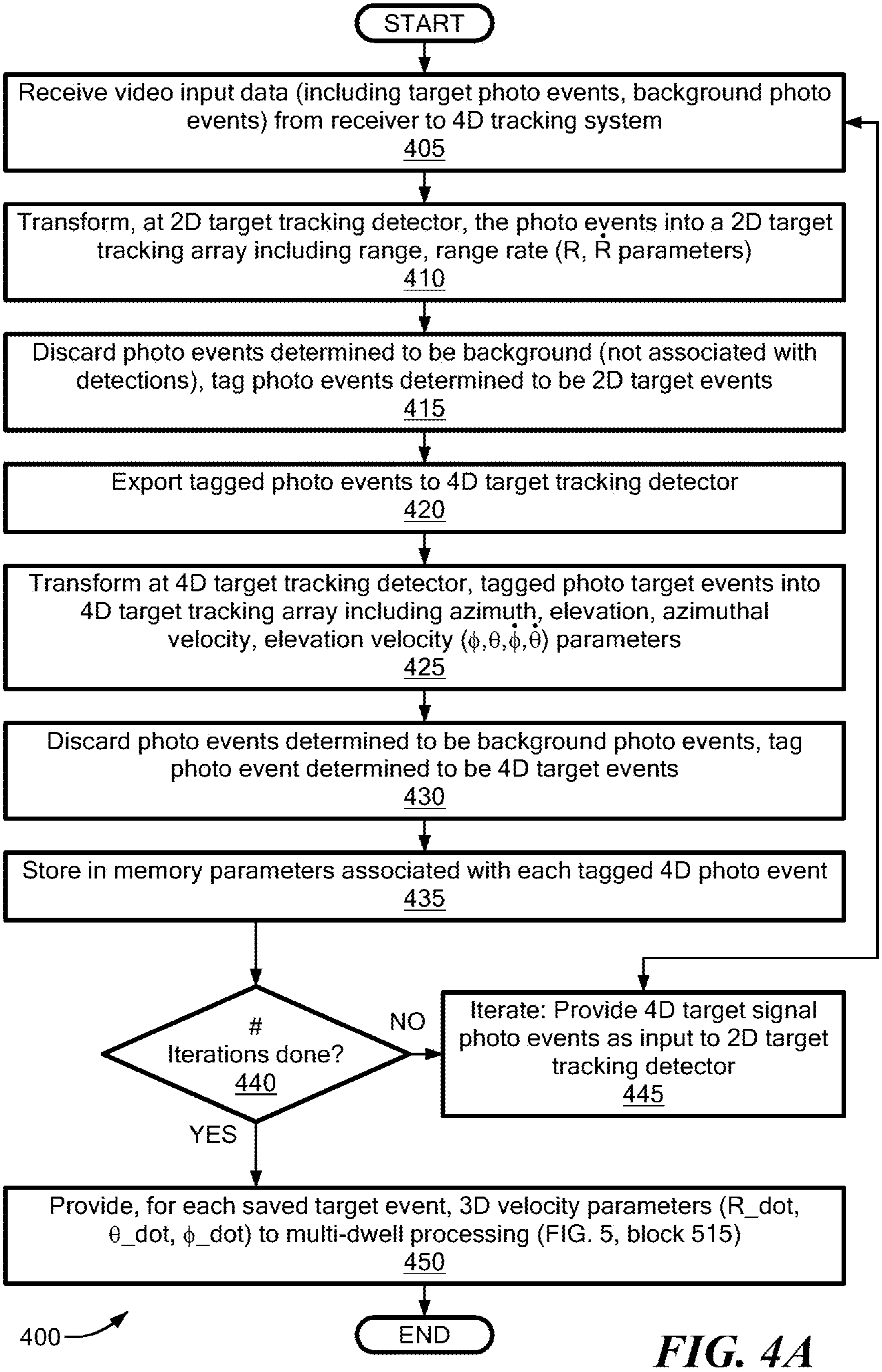
FIG. 4A is a flowchart 400 showing further details of an exemplary state space carving (SSC) process usable as part of one of the processing blocks in the flowchart of FIG. 6, in accordance with one embodiment.

Referring still to FIGS. 1 and 4A, in some implementations, the 2D target tracking detector 116 may calculate the range and the range-rate of the target in video data 126 based on a plurality of cross-correlation power values, wherein the 2D target tracking detector 116 identifies a peak cross-correlation power value (e.g., the highest cross-correlation value) from among the plurality of cross-correlation power values and determines the pair-wise difference value associated with the peak cross-correlation power value.

In block 415 of FIG. 4A, photo events that are determined to be background events (i.e., not associated with detections) are discarded, and photo events determined to be 2D target events are tagged and are exported (block 420) to the 4D target tracking detector 118. In particular, after determining the range and range-rate of the target 104 within video data 126 or attempting to find at least one peak correlating to a statistically significant result within a two-dimensional array with range and range-rate dimensions, video data 126 (with tags) may thereafter be transmitted to the 4D target tracking detector 118 (block 420). In certain embodiments, statistically significant results that are sent to the 4D target tracking detector 118 may reach a prescribed threshold of counts. In some embodiments, photo events associated with every range and range rate detection within video data 126 may be applied to the 4D target tracking detector 118. In some embodiments, video data 126 not associated with detections may be discarded or otherwise rejected before the adjusted and tagged video data 128 is exported to 4-D target tracking detector 118

In some embodiments, the 4D target tracking detector 118 may cross-range filter the photo events, accounting for both focal plane position and focal plane motion over a LADAR dwell. In block 425, the tagged photo events (received from the 2D target tracking detector 116) are transformed into a 4D target array, including azimuth, elevation, azimuthal velocity, and elevation velocity ($\phi$, $\theta$, $\dot{\phi}$, $\dot{\theta}$). Various types of 4D video trackers are usable as the 4D target tracking detector 118, as will be appreciated. In some implementations, 4D target tracking detector 118 may be operated by use of processor 110 or via an external computer system (not shown), as in FIG. 10. In some embodiments, the 4D video tracker can be implemented by configuring the processor 110 or external computer system, to generate a video filter array, the video filter array (VFA) including a set of estimated velocity pixel coordinate components arranged in a linear data set while representing a plurality of two-dimensional arrays associated with a plurality of frames, wherein, in these embodiments, the VFA may be stored in a memory and/or mass storage (not shown), as will be understood by those of skill in the art. In certain embodiments, each of the plurality of two-dimensional arrays may have dimensions equal to dimensions of the focal plane array of the receiver 108 and may generate a plurality of detected photo events based on received scattered laser pulses or video data.

The 4D target tracking detector 118, in certain embodiments, may also filter the plurality of photo events transmitted to it by linearly indexing each of the plurality of detected photo events based on, for each detected photo event, a vertical position in the focal plane array, a horizontal position in the focal plane array, a frame number, and the dimensions of the focal-plane array (block 430). For example, in some embodiments, the 4D target tracking detector 118 may discard photo events determined to be background photo events, and tag photo events determined to be 4D target events (block 430), but this is not required. The 4D target tracking detector 118, in some embodiments, may map each detected photo event to a set of estimated velocity pixel coordinate components based on a time between receiving the scattered laser pulses and the focal-plane array vertical and horizontal positions of each of the detected photo events. In some embodiments, the 4D target tracking detector 118 may store in memory parameters associated with each tagged 4D photo event (block 435).

The processor 110 may cause the 6D tracking system 114 to repeat blocks 410-435 for a plurality of iterations, until a predetermined or required number of iterations are complete (block 440). In one embodiment, after the first iteration, the photo events transformed at block 410 (2D target tracking detector) are the tagged 4D target signal photo events from block 425, as shown in block 445 of FIG. 4. The parameters associated with each of the tagged 4D target signal photo events may be stored in a memory (block 435). The parameters stored in a memory may represent a six dimensional (6D) array. The parameters may include range, range-rate, azimuth, azimuthal velocity, elevation, and elevation velocity. In certain embodiments, as further described herein, 3D velocity parameters are provided to a multi-dwell process, described further in FIGS. 5A-9 herein.

In some embodiments, the 4D target tracking detector 118 may generate a motion-compensated image associated with the mapped plurality of detected photo events in a filtered two-dimensional array having dimensions equal to the dimensions of the focal plane array. Further details regarding an implementation of an exemplary 4D tracker are described in co-pending U.S. patent application Ser. No. 17/138,365, entitled "VIDEO-TRACKING OF SPARSE GEIGER MODE DATA", filed on Dec. 30, 2020 (hereinafter "the '365 patent"), particularly the content related to generating a video filter array and using a video filter array with Geiger-mode video data (e.g., FIGS. 5A-9 and the accompanying description), which application is hereby incorporated by reference.

As a result of the process of FIG. 4A, an in particular the 4D target tracking detection blocks 420-450, four-dimensional filtered and motion compensated focal plane array images may be generated. The 6D tracking system 114 may thereafter associate each four dimensional detection with the video data that comprises it, and all other video data may be disposed of or otherwise rejected. With the four dimensional detection data output, 6D tracking system 114 may iterate (blocks 440, 445, etc.) wherein the four dimensional detection data output out of 4D target tracking detector 118 is applied to 2-D target tracking detector 116, via feedback loop 132, and subsequently 4-D target tracking detector 118. In some embodiments, 6D tracking system 114 may iterate 308 multiple times, and in some embodiments, 6D tracking system 114 may refrain from iterating 308. The resulting video data 130 may thereafter be transmitted, exported, or the like to another system for further processing. For example, in accordance with the embodiments described further herein in connection with FIGS. 5A-9, the video data 130 is, in certain embodiments, further processed using a multi dwell subsystem 120 (FIG. 1) which provides the ability to combine the output from multiple, noncontiguous dwells of a target with arbitrarily complex motion, to generate a multi-dwell image. This is discussed further herein in connection with FIGS. 5A-9.

Before proceeding to the multi-dwell subsystem and additional processing, an example using and further explaining the SSC process of FIG. 4A is first discussed. Consider an example of a target that completes its full trajectory after 1 second. The SSC process 400 (also referred to herein as SSC method 400) of FIG. 4A is used to process a single 150 ms dwell at the beginning of the target trajectory. In some embodiments, after the SSC subsystem 117 processing, the SSC subsystem 117 produces three primary outputs (along with several ancillary metrics, including measurement uncertainties). These outputs include:

1. A list of statistically significant targets that were detected within the data, and their associated 6D state-space position
2. Pointers to the raw photo-events associated with each target
3. Pointers to the pulses that correspond to each photo-event FIG. 4B is a first table 460 showing raw photo events and pulses associated with two exemplary targets, as generated by the SSC method of FIG. 4A, in accordance with one embodiment. In the table 460 of FIG. 4B, the first column is the identification number (ID #) of the target, the second column is a set of pointers to raw photo events (s) (Pes) (i.e., #2 above), and the third column is the set of pointers to the pulses that correspond to each photo event (i.e., #3 above).

FIG. 4C is a second table 470 showing the 6D state space positions of the two targets of FIG. 4B, as generated using the SSC method of FIG. 4A, in accordance with one embodiment. As the table 470 shows, for each of the two targets, the $1^{st}$ column is Range position, the $2^{nd}$ column is X position, the $3^{rd}$ column is Y position, the $4^{th}$ column is Range velocity, the $5^{th}$ column is X velocity, and the $6^{th}$ column is Y velocity.

Figure 4D:
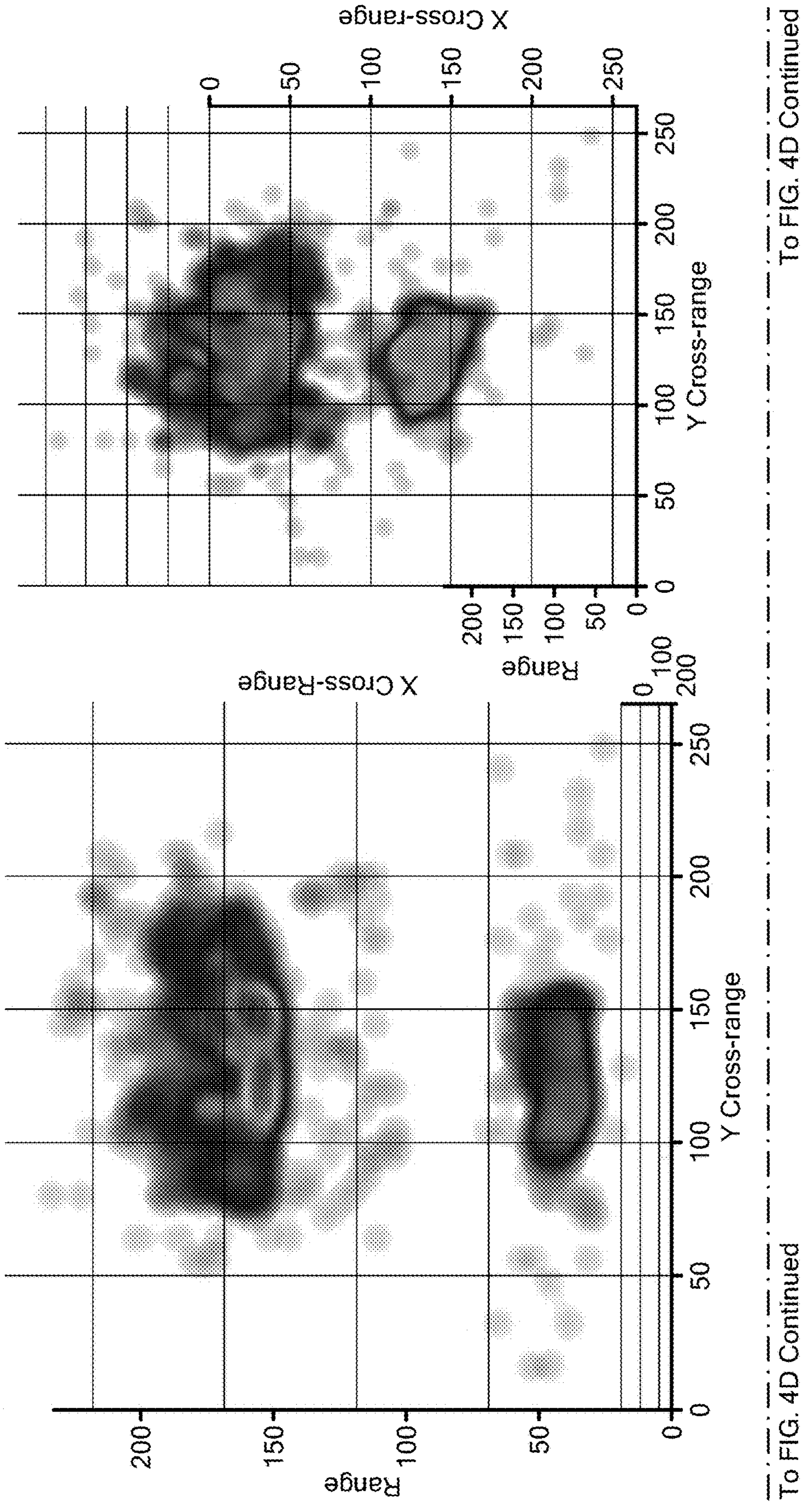
FIG. 4D is a first exemplary image of a single dwell, based at least in part on the method of FIG. 4A and the target information in FIGS. 4B-4C illustrating an exemplary target trajectory and outputs in a single dwell.
Figure 4D:
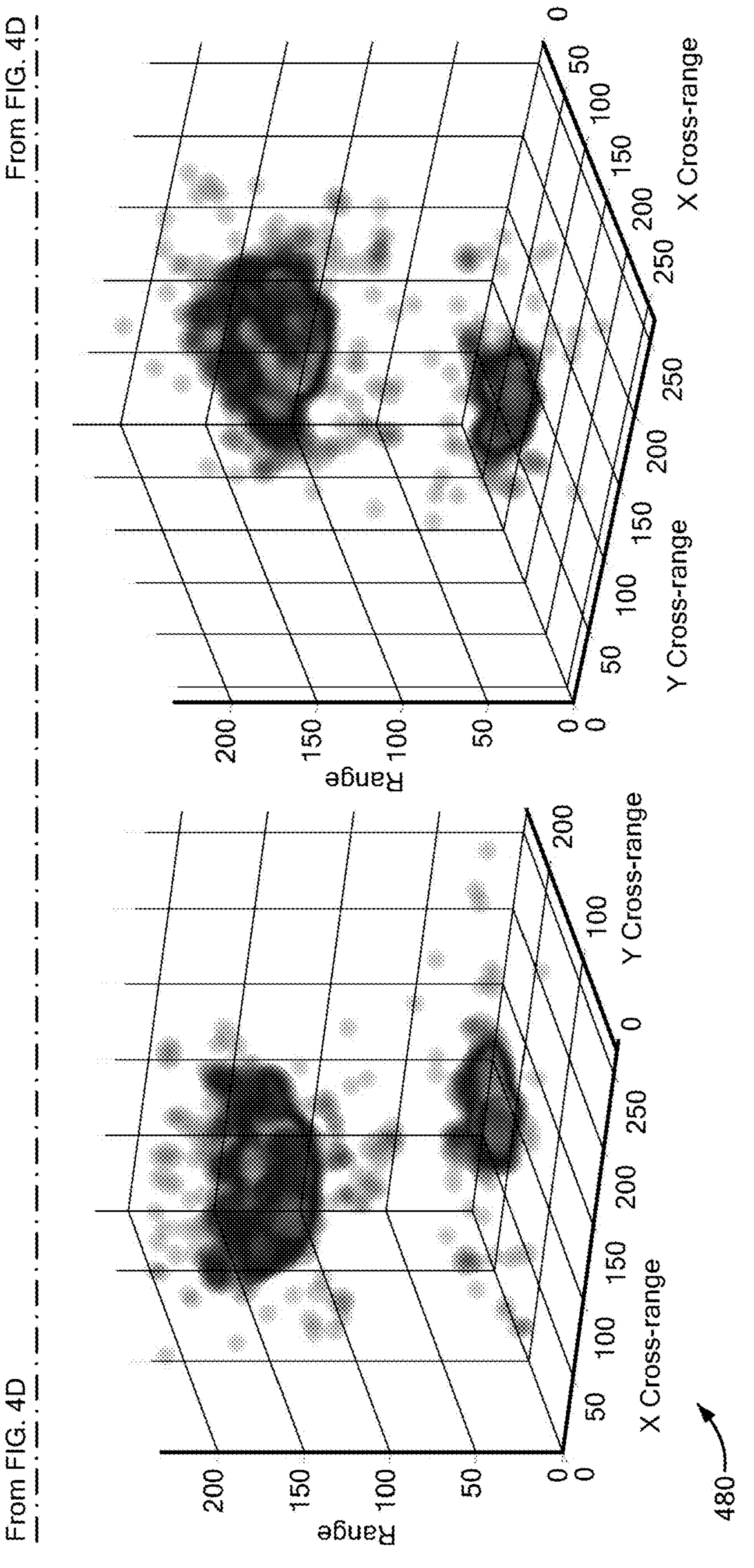
Figure 4E:
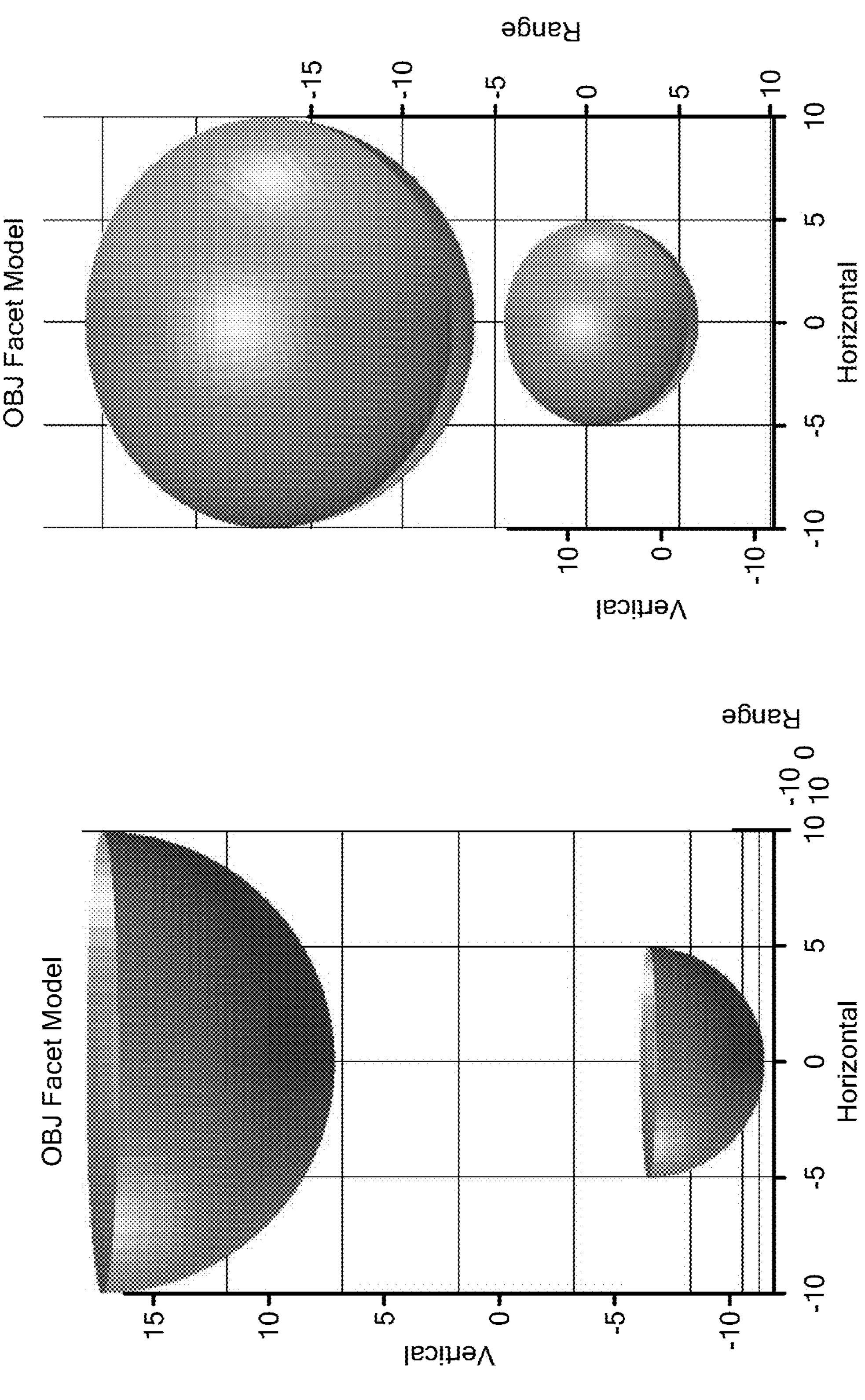
FIG. 4E is an image depicting object facet models generated based on the image of FIG. 4D, for a single dwell, in accordance with one embodiment.
Figure 4E:
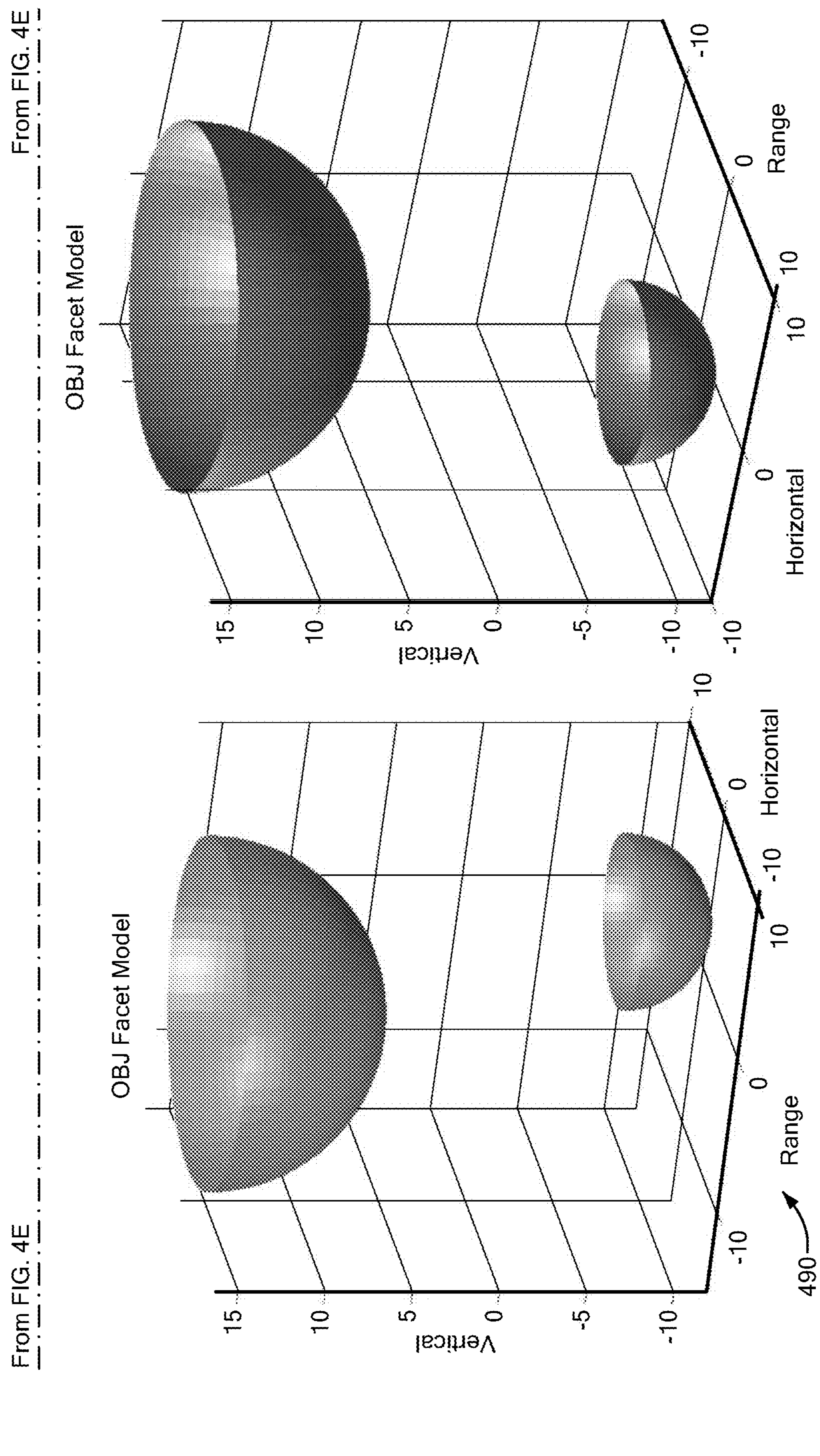

By combining the output of the SSC process 400 of FIG. 4As output with the raw measured data (e.g., table 460 of FIG. 4B and table 470 of FIG. 4C), for the exemplary first and second targets of FIGS. 4B and 4C, it is possible to generate an image from the photo-events that were tagged as signal. Furthermore, because the SSC process 400 includes a determination of the target's 3D velocity, it is possible to perform this image-formation within the target's own reference frame, thereby obtaining a motion-compensated point-cloud, as shown in FIG. 4D, which is a first exemplary image 480 of a single dwell, based at least in part on the method of FIG. 4A and the target information in FIGS. 4B-4C illustrating an exemplary target trajectory and outputs in a single dwell. FIG. 4E is an image 490 depicting object facet models of targets 1 and 2 of FIG. 4C, generated based on the image of FIG. 4D, and the data of FIG. 4C, for a single dwell, in accordance with one embodiment. The resulting image (object facet models of FIG. 4E) are roughly recognizable as corresponding to the original input bi-sphere model of FIG. 2.

The images depicted in the examples FIGS. 4B-4E help to illustrate, in accordance with some embodiments, the remarkable sensitivity of the SSC method of FIG. 4A. This observing scenario—with ~350 signal photo-events scattered among >240,000× more background events—would have yielded a non-detection with conventional processing techniques. The SSC method of FIG. 4A, however, is able to detect, segment, motion-compensate, and image-form the bi-sphere complex of FIG. 2. While the SSC method of FIG.

4A provides certain advantages and features, such as background rejection, further testing has shown that the output of this algorithm can be used for robust automatic image formation, in the presence of unknown target motion and high background, across multiple noncontiguous dwells. In certain embodiments herein, systems, methods, and apparatuses are provided that are configured to leverage the novel approach to "detection" that SSC uses and to apply this technique to image formation. Specifically, in certain embodiments, by performing image formation and state-space acquisition simultaneously (or at least substantially simultaneously), the embodiments described herein allow an observer to collect low-SNR target data, and detect, segment, and image-form simultaneously, even in scenarios where the target data were collected across non-contiguous dwells, and/or where the target has unknown complex motion.

As will be appreciated, there can be various types of scenarios which may force a LADAR system to take data of a single target in a non-contiguous fashion. On example is where a LADAR system must prioritize a variety of tasks, of which collecting data of the target in question is but one. The need to balance these tasks imposes a disjoint revisit schedule onto the target. Another example is where a given target has (a priori) unknown, non-linear motion; in such an example, the need to detect the target imposes a maximum contiguous integration time, as higher order moments of the unknown motion will smear out the target signal over long dwells. In both these examples, the multi-dwell process described below, in accordance with some embodiments, allows an observer to take data from disparate, noncontiguous sub-dwells, and combine those data to improve the image SNR beyond that of any individual sub-dwell. In some embodiments, the combined image quality will approach that of a single dwell of a stationary target with integration time equal to the sum of the integration times over all the sub-dwells. In some embodiments, the final image SNR will differ from that of an equivalent contiguous dwell only by factors limiting the determination of the target's instantaneous velocity (i.e., the state-space resolution). In some embodiments, because of the sensitivity of the SSC process, the multi dwell process can be carried out in scenarios where even detecting the target would be challenging for any standard, non-state-space based acquisition process.

Figure 5A:
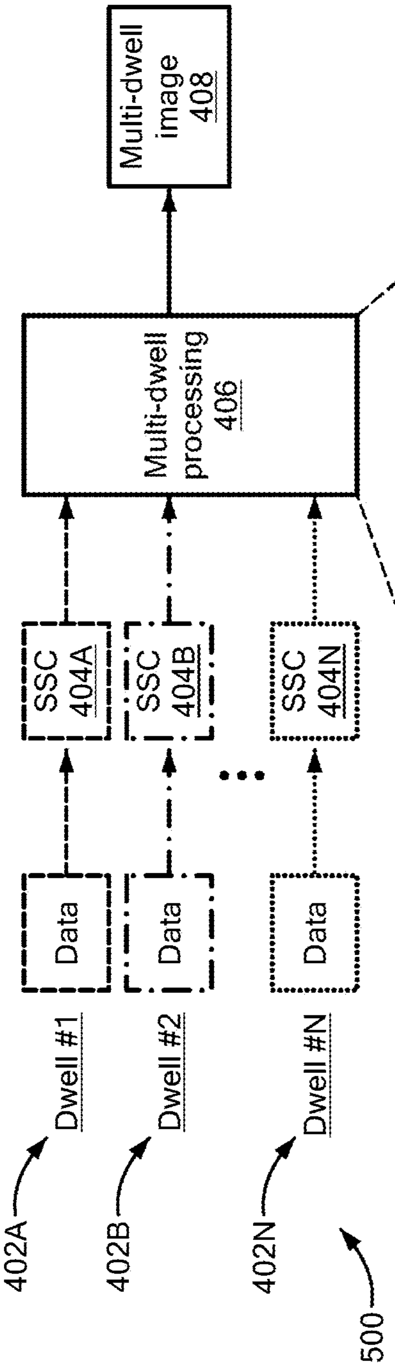
FIG. 5A is an exemplary block diagram illustrating overall processing flow of a system that implements multi-dwell processing, in accordance with one embodiment.
Figure 5B:
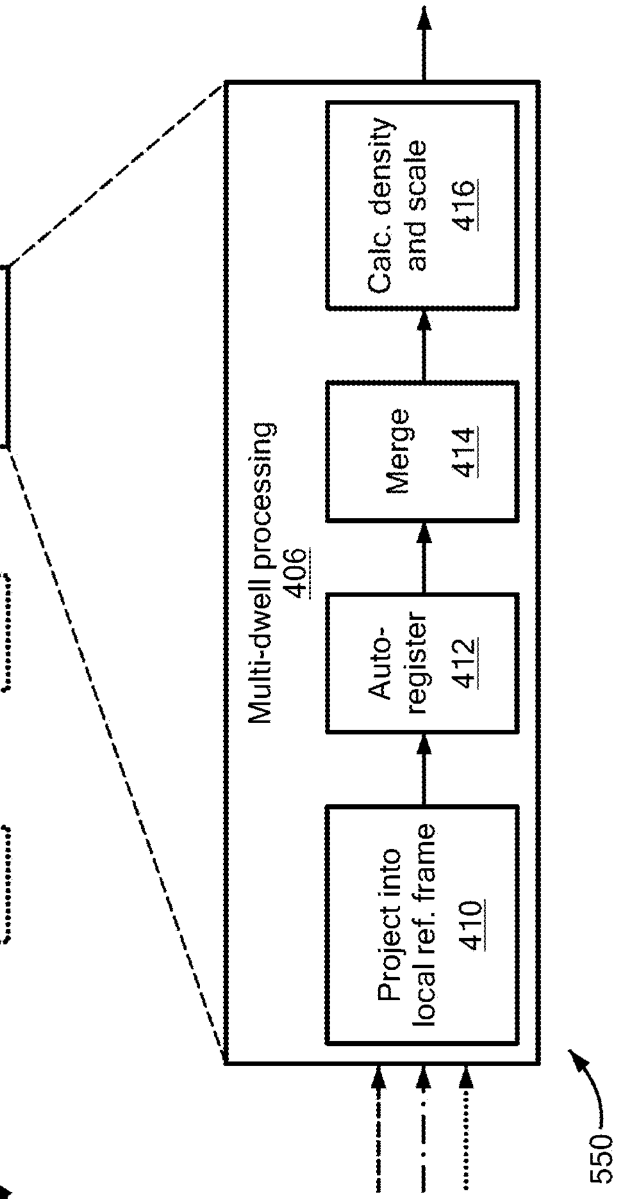
FIG. 5B is an exemplary block diagram illustrating at a high level certain sub-processes in the multi-dwell processing block of FIG. 5A.

FIG. 5A is an exemplary block diagram 500 illustrating overall processing flow of a system that implements multi-dwell processing, in accordance with one embodiment. FIG. 5A illustrates a processing flow where a plurality of dwells 402A-402N are each processed by a process that is able to provide 3D velocity as an output, such as respective SSC sub process 404A-404N. The outputs of each of the respective SSC sub processes 404A-404N are combined into multi-dwell processing sub process 406, to generate a multi-dwell image 408. FIG. 5B is a block diagram 550 illustrating at a high level certain sub-processes in the multi-dwell processing block of FIG. 5A. In certain embodiments, FIG. 5B provides a system for generating a single motion-compensated 3D image from an arbitrary number of individual LADAR dwells with arbitrary temporal separations. In certain embodiments, FIG. 5B provides a multiwell processing algorithm that combines target acquisition results from multiple dwells into one merged 3D image. FIG. 6 is a flowchart 600 illustrating a method that operates in the system of FIG. 1 and in accordance with the block diagrams of FIGS. 5A-5B.

Referring to FIGS. 1 and 5A-6, data 402 are received (block 505), where the data is based on the 106 transmitter transmitting pulses 122 to one or more regions, potentially from disparate, noncontiguous sub dwells (e.g., multiple small dwells). Next a process is performed on the received data (block 610) to (1) tag photo events within 6-dimensional space, and (2) assign each respective tagged photo event/object a position in 6D space. In certain embodiments, the State Space Carving (SSC) process of FIG. 4A (e.g., SSC 404 of FIG. 5) is configured to achieve (1) and (2), as shown in FIG. 6 at block 615, but this is not limiting. For example, in certain embodiments, the SSC sub-processes 404A-404N are configured to use an SSC process (e.g., the SSC process of FIG. 4A) to estimate 6D state for each dwell, such as via information estimating each respective photo event's respective position in six-dimensional (6D) space during its respective dwell. However, those of skill in the art will appreciate that other processes may be usable to tag photo events within a 6D space and to assign each respective tagged photo event a position within 6D space. That is, although at least some advantageous embodiments use the SSC process of FIG. 4A, it is not required, and any process capable of completing the actions of block 610, is usable in accordance with at least some embodiments herein. For example, in at least some embodiments, instead of the SSC process, the actions of block 610 can be completed using any one or more of a 3D velocity filtering process, SAS maps, coincidence processing, and peak tracking.

As an output of block 610, for each tagged photo event in the set of photo events generated in block 610, a 3D velocity determination is received (block 620), the 3D velocity determination including, for example, parameter such as $\dot{R}$, $\dot{\phi}$, $\dot{\theta}$ from the process output of block 610. The dwells are projected into a common reference frame by compensating for motion (block 410). For example, each dwell's photo events are projected into the target's own reference frame (instantaneous reference frame) (block 625), i.e., a common reference frame, as determined by the 3D velocity determination of block 620. This results in a set of motion-compensated point clouds for each dwell. In block 630, the resulting motion-compensated point clouds for each dwell are auto-registered against one another using a variation of the Iterative Closest Point (ICP) algorithm, wherein the registration (which in certain embodiments is an auto-registration) helps to register point clouds to refine translation and rotation. This process helps to make slight adjustments to the point cloud to help minimize the distance between the photo events and their corresponding 3D position, based across the different dwells, including taking into account rotation of the target or receiving source between dwells, as well as arbitrary motion of the target between dwells. For example, an object may have natively rotated, or the receiver 108 (or other system) that is receiving the information, could have changed, such that its "view" of the object/target being imaged, may have changed, such that the target/object might "appear" to have been rotated. In another example, detected images might be subject to geometric distortion introduced by perspective irregularities wherein the position of the camera(s) with respect to the scene alters the apparent dimensions of the scene geometry.

As is known in the art, applying an affine transformation to a uniformly distorted image can correct for a range of perspective distortions, by transforming the measurements from the ideal coordinates to those actually used. Effectively, in certain embodiments, the auto registration operation of block 630 performs affine transformation, which, as those of skill in the art will appreciate, helps to correct for geometric distortions or deformations that occur with non-ideal camera angles.

As those of skill in the art will appreciate, in certain embodiments, commercial mathematical modeling tools, such as Computer Vision Toolbox™ (hereinafter "Toolbox," and available from MathWorks of Natick MA), are usable to provide various computerized mathematical tools to help implement steps such as the auto registration of block 630. The Toolbox provides point cloud registration, geometrical shape fitting to 3-D point clouds, and the ability to read, write, store, display, and compare point clouds, as well as the ability to combine multiple point clouds to reconstruct a 3-D scene. The Toolbox can implement registration algorithms usable in the method of FIG. 6, which are based on the Iterative Closest Point (ICP) algorithm, the Normal-Distributions Transform (NDT) algorithm, the phase correlation algorithm, and the Coherent Point Drift (CPD) algorithm, respectively, as will be understood by those of skill in the art. Commonly assigned U.S. patent publication 20200371240 ("REAL-TIME IMAGE FORMATION FROM GEIGER-MODE LADAR"), which is incorporated by reference, also describes applying the ICP algorithm in LADAR processing.

Referring again to FIGS. 1, 5A, and 5B, after registration (block 630), the registered point clouds are merged into a single conglomerate, which in this embodiment corresponds to a single volumetric image made up of distinct parts (the registered point clouds) (block 635). The local spatial density in the volumetric image is computed (block 640), and then a non-liner scaling is applied (block 645) to the local spatial point density. As explained further herein, the process steps 640-650 may not be necessary in all embodiments, especially if the results are not displayed to a human observer. The resulting image, with non-linear scaling, can be displayed, if needed, such as output device 112 (FIG. 1); alternately, the resulting image can be provided to another entity process for further action. The output of the multi-dwell processing is, thus, a multi-dwell image 408 (FIG. 5A), which results from combining the data 402 from disparate, non-contiguous sub-dwells, after the processing of blocks 605-650, into a 6D image with improved SNR as compared to an image based on only one dwell (e.g., a long dwell) (block 655).

An advantage of the method of FIG. 6 is its ability to get higher fidelity images in less time. In prior art methods, to obtain a high fidelity image, it can be necessary to devote a large amount of contiguous aperture time through that process, which can make it very "expensive" from an operational point of view—meaning, the time spent using the processor, transmitter, receiver, sensors, etc., to process the longer continuous aperture time, is taken away from allowing a system to do other things with those components and modules in the system. The method of FIG. 6 enables high fidelity imaging with a larger number of small dwells on the target, which is much more convenient to the overall system in terms of its operation and timeline.

Yet another advantage of the method of FIG. 6 is that this method also can create/provide 3D images from data that was taken incidentally while doing other things, e.g., data that wasn't necessarily coordinated in time as part of a planned set of dwells intended to image a specific area or object. For example, the method of FIG. 6 is usable for data that is separated in time, which data may have been a byproduct of taking data for other reasons. The method of FIG. 6 can be used, for example, to locate an unexpected image of something that can be discerned or detected by looking through various sets of data taken at different times, by different entities, wherein, after analysis, a target or particular target motion can be found or even discovered, via analysis of the data in accordance with the method of FIG. 6 (along with methods such as that of FIG. 4A, which can create 3D velocity data), to create a resulting 3D image of a target and also its motion, including targets whose motion is not known and/or was not expected, and/or targets whose existence or motion may be "buried" in other data, including discontinuous data. The method of FIG. 6 thus can be applied to image data taken via many other types of existing techniques, including data taken at separate times, especially data from any process that is configured to output 3D velocity information about a photo event.

Figure 7:
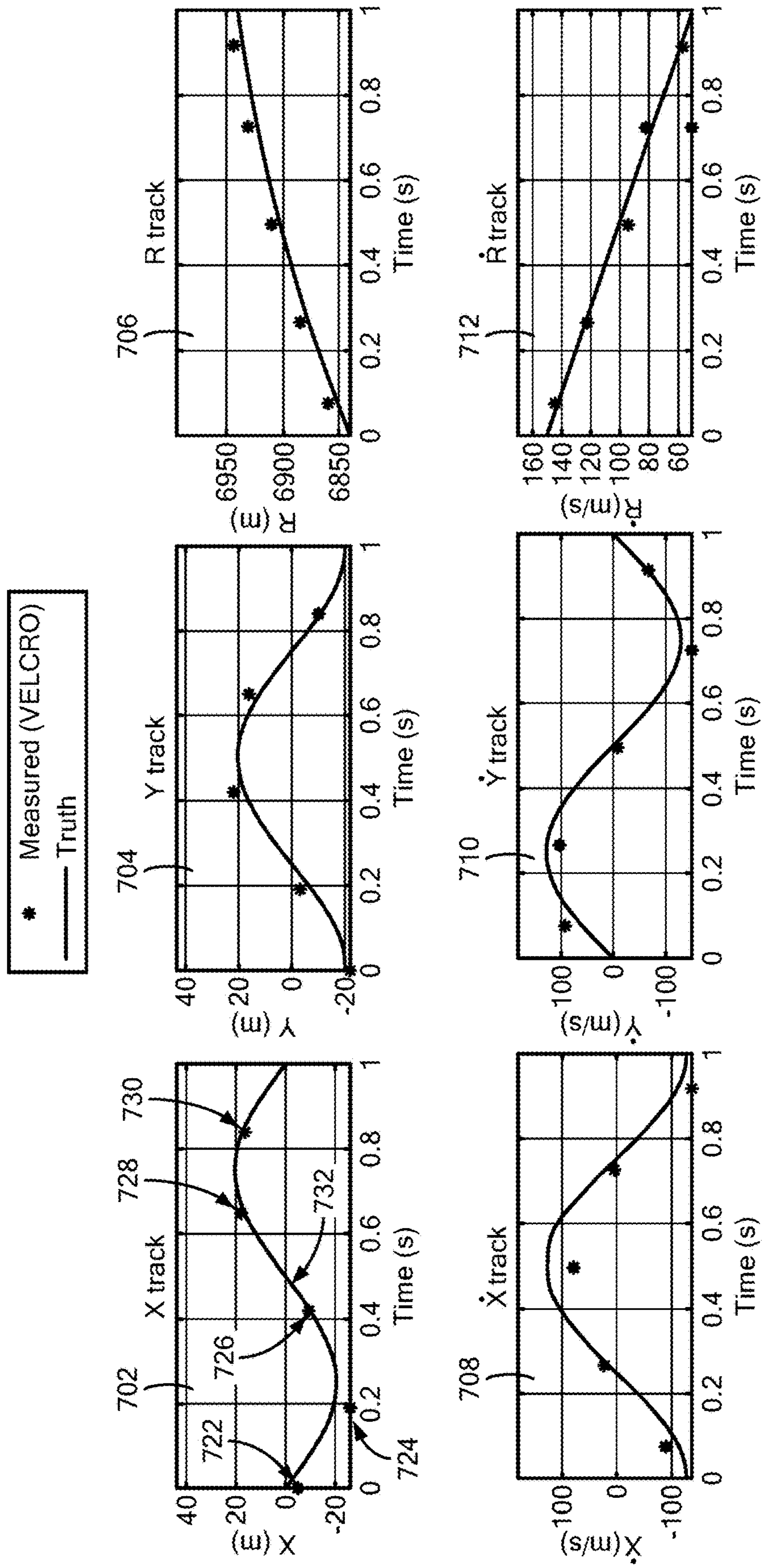
FIG. 7 is a set of graphs illustrating the operation of the method of FIG. 6 to produce single-dwell state estimates, in accordance with one embodiment.

FIG. 7 is a set of graphs 702-712 illustrating an exemplary operation of the method of FIG. 6 to produce single-dwell state estimates, in accordance with one embodiment. FIG. 7 builds on the previous example of FIGS. 2-4E. Consider a set of five 150 ms noncontiguous dwells, scattered throughout the target's 1-second period-of-motion. For example, in FIG. 7, in plot 702, the 5 150 ms noncontiguous dwells are shown, e.g., as the asterisks 722, 724, 726, 728, 730 that follow along the curve 732, are center points at the times the measurements are taken (this is similar for the other coordinates shown in plots 704, 706, 708, 710, 712). As FIG. 7 shows, at t=0 seconds, at the first "dwell" 722, the approximate position of the target is at x=−5 m, y=−20 m, and estimated R=6845 m. By the time of the second "dwell" 724, at t=0.2 s, the approximate dimensions are x=−20 m, y=−5 m, and estimated R=6875 m. As FIG. 7 illustrated, in between each of the dwells, the target is moving continuously and potentially in a complicated way, where both the position and the velocity are varying sinusoidally in x and y and where the object is accelerating in the range direction. And the object is doing this continuously, even though the dwells are only being taken at discrete intervals. The solid line labeled "truth" in each plot, is the object's actual trajectory. In accordance with FIGS. 4A and 6, the SSC process of FIG. 4A (and block 610 of FIG. 6) operates on each dwell independently, generating detections for each. Within the uncertainty bounds, the state-space position of the bi-sphere (FIG. 2) is extracted accurately.

Figure 8A:
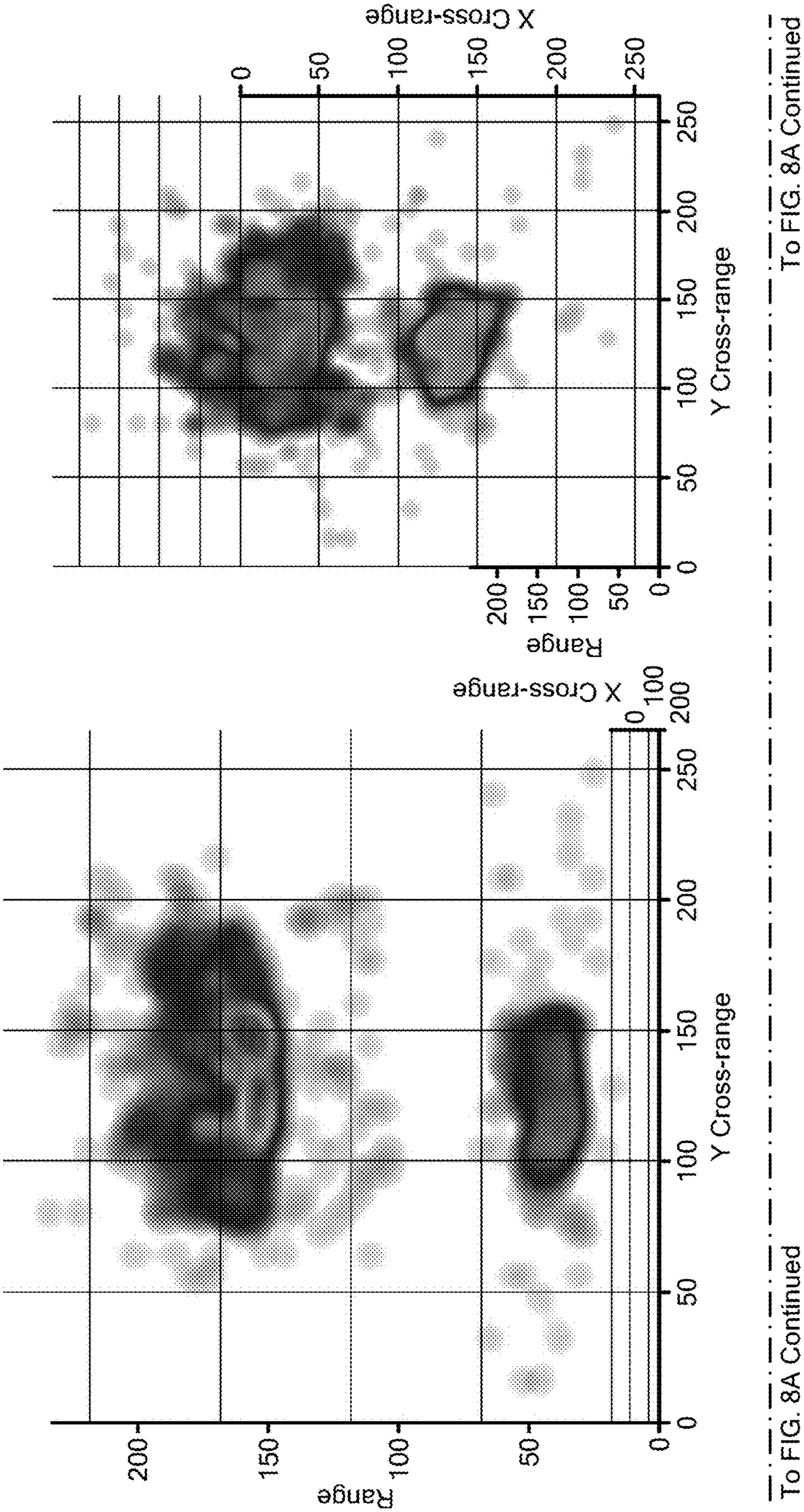
FIG. 8A is a first exemplary merged point cloud image of a single dwell image, in accordance with one embodiment
Figure 8A:
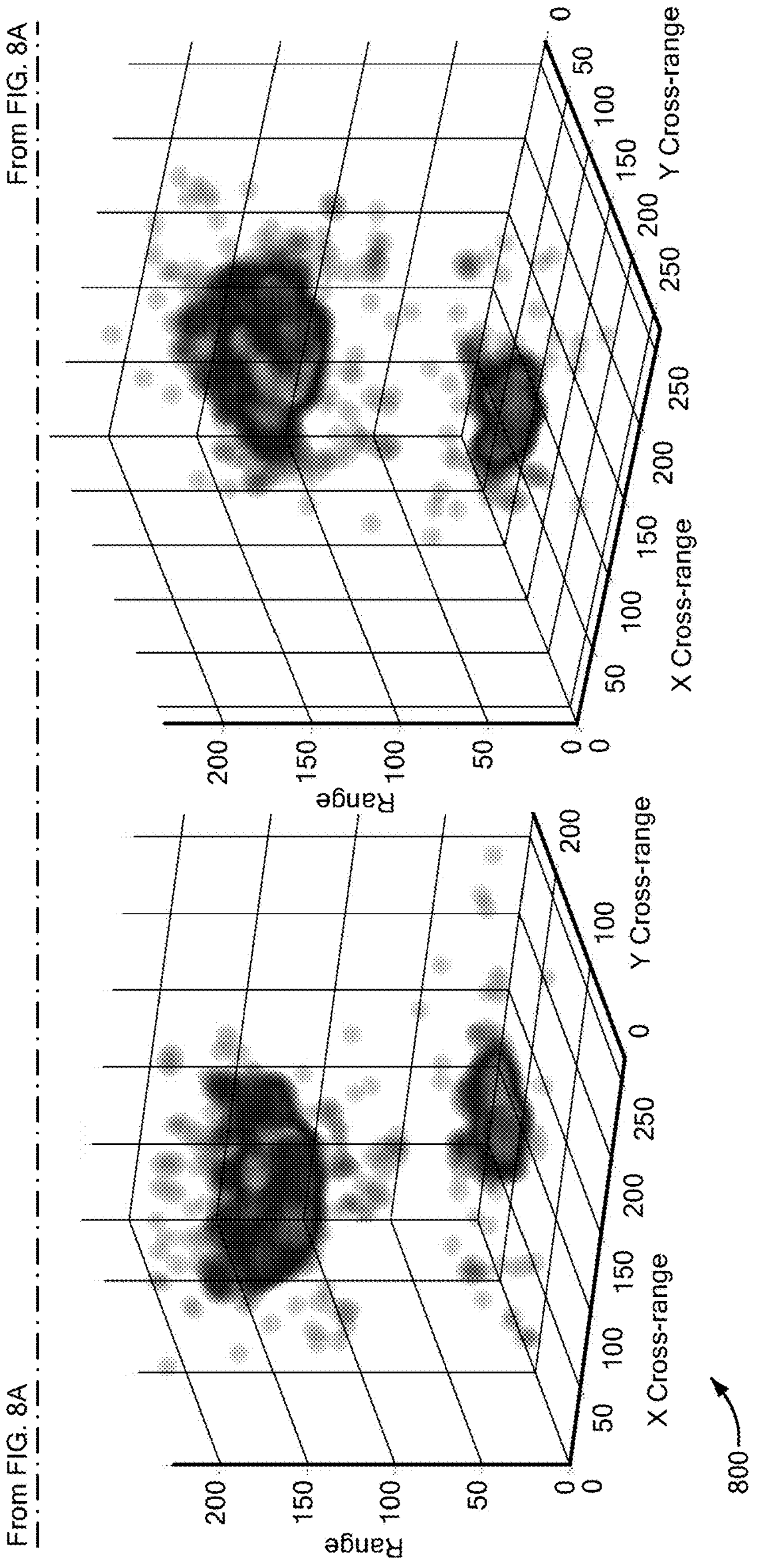
Figure 8B:
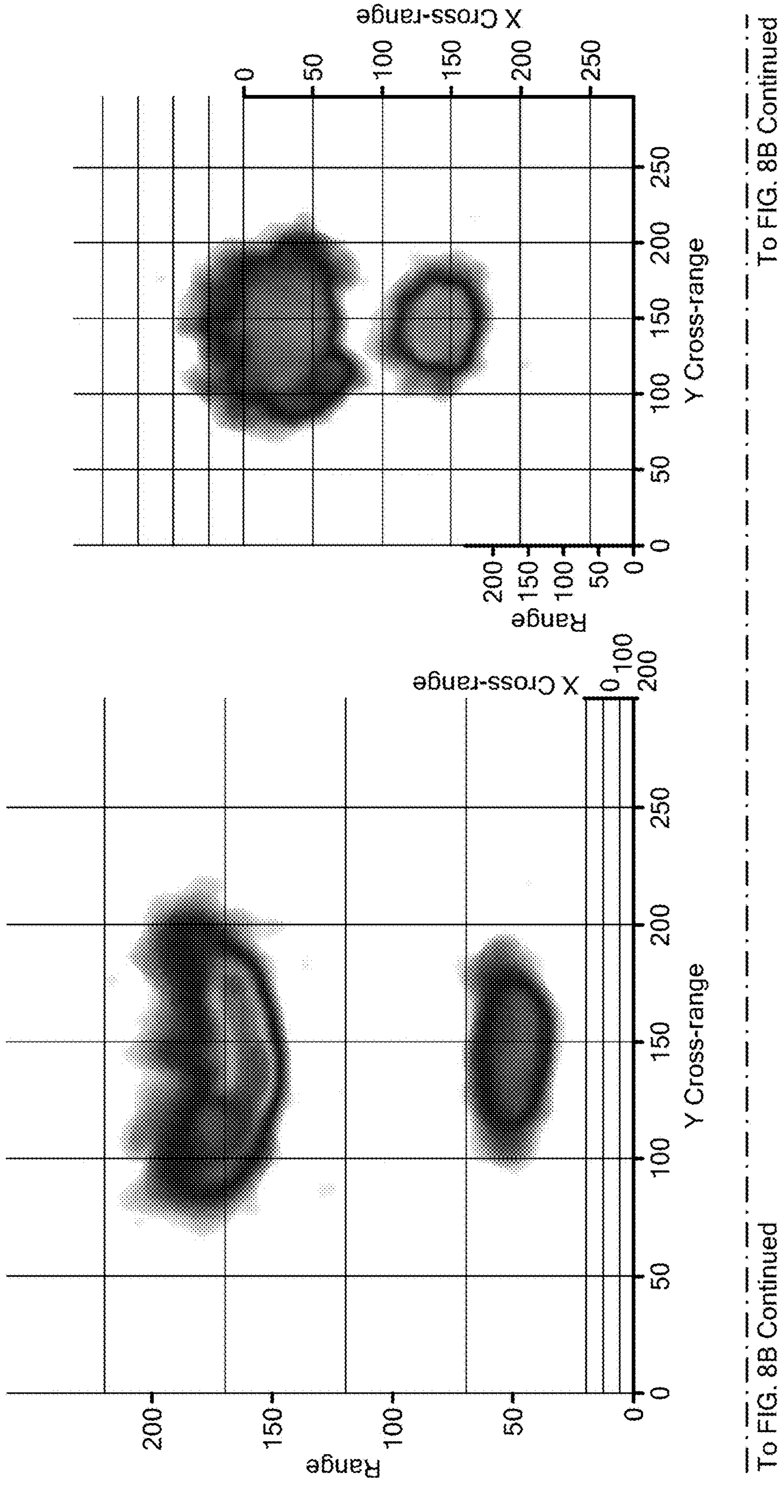
FIG. 8B is a second merged exemplary point could image of a multi-dwell image, in accordance with one embodiment.
Figure 8B:
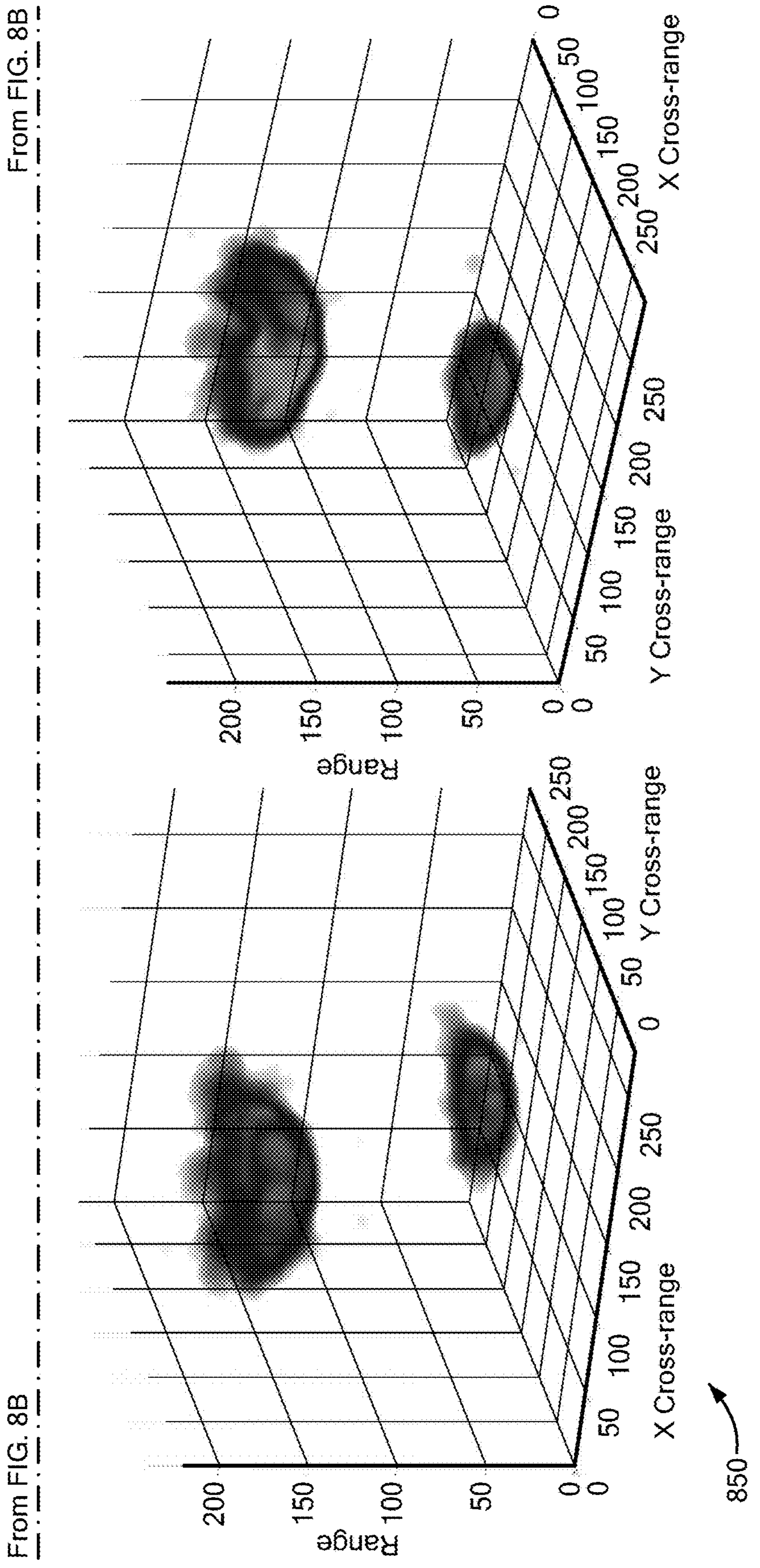

In accordance with some embodiments, herein, the multi-dwell processing of FIG. 6 can be applied to the sets of detections of FIG. 7, to create a merged point cloud. This merged output has significantly higher image SNR than that of a single dwell. For example, FIGS. 8A-8B are a first pair of exemplary merged point cloud images comparing a singled dwell image 800 (FIG. 8A) with a multi-dwell image 850 (FIG. 8B), in accordance with one embodiment. Note that this result was achieved on an exemplary target with a smoothly-differentiable motion—i.e., the target had non-zero components to its velocity, acceleration, jerk, etc.

Figure 9A:
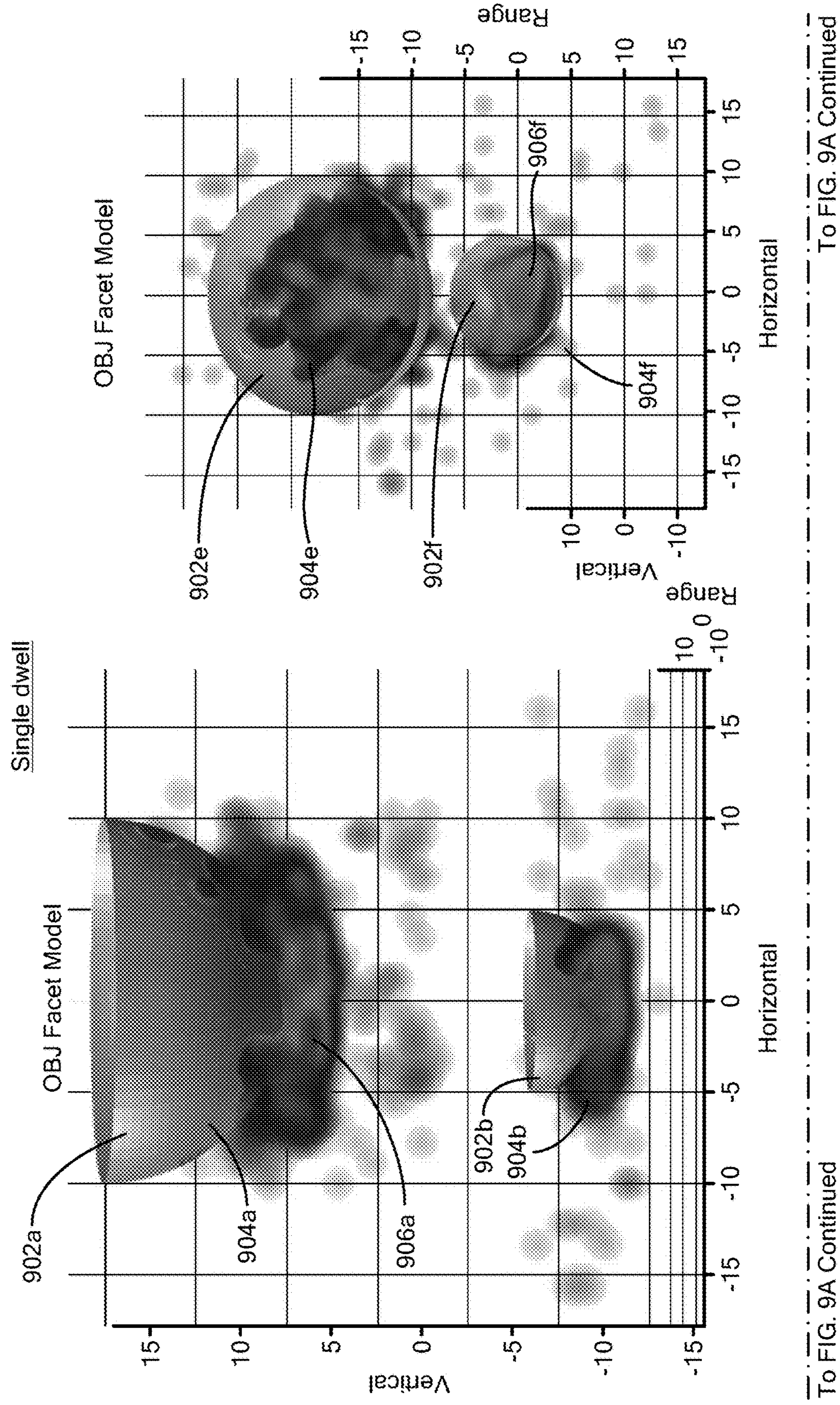
FIG. 9A is a first exemplary point cloud image of a single dwell image with object facet model.
Figure 9A:
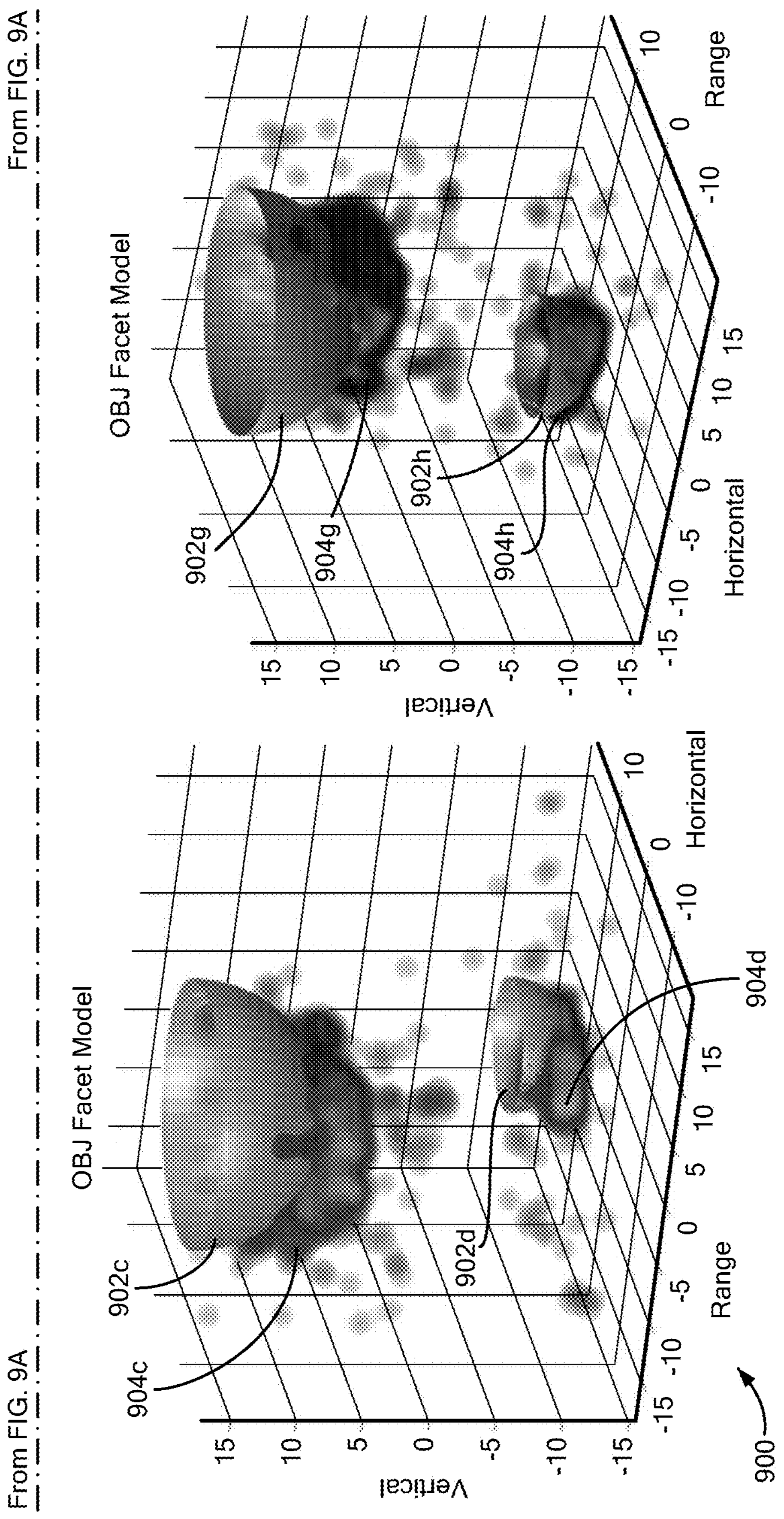
Figure 9B:
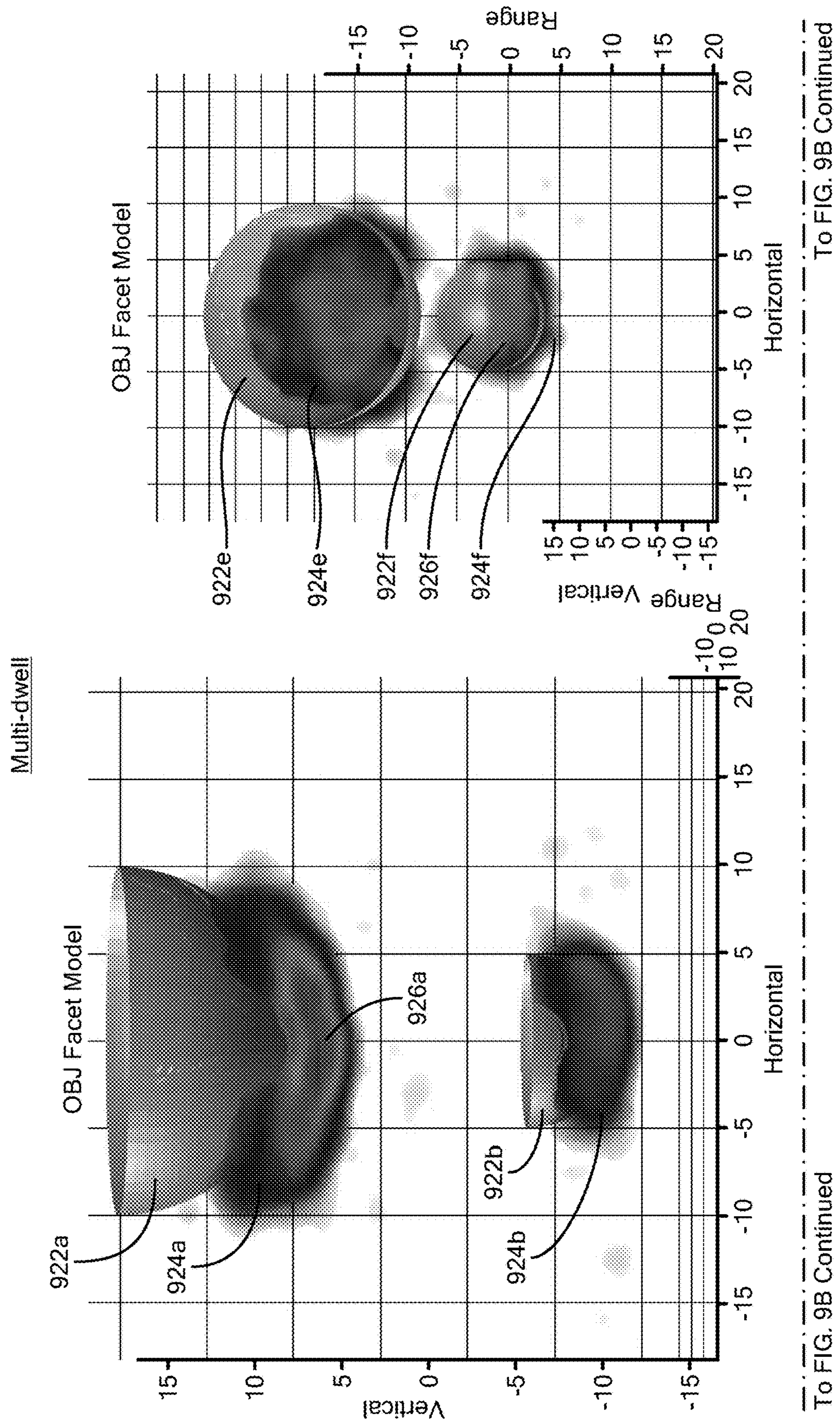
FIG. 9B is a second exemplary point cloud image of a multi-dwell image with object facet model, in accordance with one embodiment.
Figure 9B:
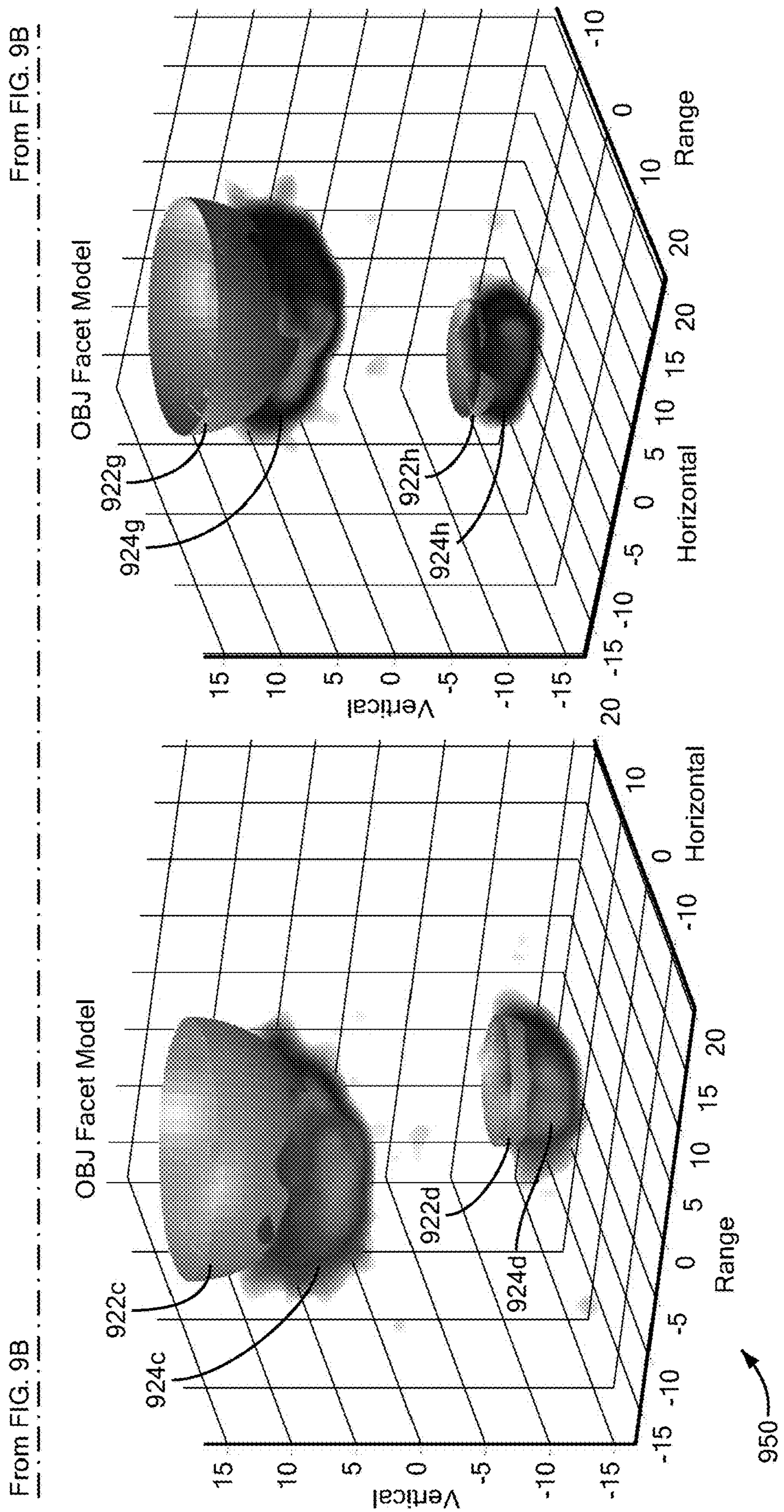

FIGS. 9A-9B are a second pair of exemplary point cloud images comparing a single dwell point cloud image 900 with object facet model (FIG. 9A) with a multi-dwell image with object facet model (FIG. 9B), in accordance with one embodiment. FIG. 9A illustrates a single-dwell point-cloud image 900 for the original model of FIG. 2, and FIG. 9B illustrates a multi-dwell point-cloud 950 for the original model of FIG. 2. As a comparison of FIG. 9B vs FIG. 9A shows, compared against the original model (right figure), the multi-dwell imagery of FIG. 9B has higher SNR, better shape fidelity, and wider coverage than single-dwell images. In FIG. 9B, the point cloud 924 represents the output of block 650 of FIG. 6, and the object facet model 922 is the actual shape of the target. As can be seen, point cloud 924 of FIG. 9B, that results from the multi-dwell process of FIG.

6, is a better approximation of the actual shape than is the point cloud 906 of FIG. 9A (single dwell).

Another aspect to note in FIGS. 9A and 9B are the specific dense regions labeled as 906 in FIG. 9A (single dwell) and 926 in FIG. 9B (multi dwell). These areas are at a higher density because there is a greater density of points in those regions (greater local density), because, for the example object of FIG. 2, there is a bigger surface of which the transmitted pulses can reflect. Thus, a greater number of points corresponds to a greater density, and this is an area of the image where a process step like determining local spatial point density (block 640) and applying non-linear scaling to the local spatial point density (block 645) provide advantages. Without scaling for local spatial density, it can be more difficult to "see" that one is looking at/detecting a surface. In particular, for a human observer, it can be difficult to detect such spatial density, and it may merely look like a cluster of points in a region. This scaling can be advantageous if the output of the method of FIG. 6 is to be displayed to a human observer, to help present the findings in a way a human observer can see. However, if the output of the method of FIG. 6 is to another process or entity that does not need to display the image to a human observer, it may not be necessary to perform the blocks 640-650, as the next entity or process may be able to discern spatial point density in other ways.

As can be seen in the above descriptions of various embodiments herein, in certain embodiments, the multi-dwell process herein (e.g., of FIG. 6) leverages the novel approach to acquisition utilized by the State-Space Carving of FIG. 4A and applies this technique to image formation. In certain embodiments, because both functions are performed simultaneously, overall system resources are employed more efficiently, increasing capacity and reducing latency. Further, in certain embodiments, the use of disjoint dwells provides maximum flexibility in aperture time scheduling. In addition, in certain embodiments, the use of 6D segmentation enables application of the techniques herein to complex non-rigid scenes.

It is envisioned that any or all of the embodiments described herein and/or illustrated in FIGS. 1-9B herein could be combined with and/or adapted to work with the technologies described in one or more of the commonly assigned U.S. patent applications and patents that have been listed above and additionally, including but not limited to:

- U.S. patent application Ser. No. 16/863,064 ("SYSTEM AND METHOD FOR DETERMINING RANGE-RATE AND RANGE EXTENT OF A TARGET)"; Ser. No. 17/138,365 ("VIDEO-TRACKING OF SPARSE GEIGER MODE DATA"); Ser. No. 17/138,386 ("SIX DIMENSIONAL TRACKING OF SPARSE LADAR DATA")
- U.S. Patent Publications: 20210341606 ("SYSTEM AND METHOD FOR CALCULATING A BINARY CROSS-CORRELATION"); 20200371240 ("REAL-TIME IMAGE FORMATION FROM GEIGER-MODE LADAR"); and 20210341576 ("HIGH PULSE REPETITION FREQUENCY LIDAR")
- U.S. Pat. No. 10,620,315 ("LADAR RANGE ESTIMATE WITH RANGE RATE COMPENSATION"); U.S. Pat. No. 10,371,818 ("MOTION COMPENSATION FOR DYNAMIC IMAGING"); U.S. Pat. No. 9,858,304 ("COMPUTING CROSS-CORRELATIONS FOR SPARSE DATA"); and U.S. Pat. No. 9,335,414 ("FREQUENCY AGILE LADAR").

Each of the above patents and patent publications is incorporated by reference.

FIG. 10 is a block diagram of an exemplary computer system usable with at least some of the systems and apparatuses of FIGS. 1-9B, in accordance with one embodiment. In some embodiments, the computer system 1000 of FIG. 10 can be usable as the processor 110 of FIG. 1. Reference is made briefly to FIG. 10, which shows a block diagram of a computer system 1000 usable with at least some embodiments. The computer system 1000 also can be used to implement all or part of any of the methods, equations, and/or calculations described herein.

As shown in FIG. 10, computer 1000 may include processor/CPU 1002, volatile memory 1004 (e.g., RAM), non-volatile memory 1006 (e.g., one or more hard disk drives (HDDs), one or more solid state drives (SSDs) such as a flash drive, one or more hybrid magnetic and solid state drives, and/or one or more virtual storage volumes, such as a cloud storage, or a combination of physical storage volumes and virtual storage volumes), graphical user interface (GUI) 1010 (e.g., a touchscreen, a display, and so forth) and input and/or output (I/O) device 1008 (e.g., a mouse, a keyboard, etc.). Non-volatile memory 1004 stores, e.g., journal data 1004*a*, metadata 1004*b*, and pre-allocated memory regions 1004*c*. The non-volatile memory, 1006 can include, in some embodiments, an operating system 1014, and computer instructions 1012, and data 1016. In certain embodiments, the computer instructions 1012 are configured to provide several subsystems, including a routing subsystem 1012A, a control subsystem 1012*b*, a data subsystem 1012*c*, and a write cache 1012*d*. In certain embodiments, the computer instructions 1012 are executed by the processor/CPU 1002 out of volatile memory 1004 to implement and/or perform at least a portion of the systems and processes shown in FIGS. 1-9B. Program code also may be applied to data entered using an input device or GUI 1010 or received from I/O device 1008.

The systems, architectures, and processes of FIGS. 1-9B are not limited to use with the hardware and software described and illustrated herein and may find applicability in any computing or processing environment and with any type of machine or set of machines that may be capable of running a computer program and/or of implementing a LADAR/LIDAR system. The processes described herein may be implemented in hardware, software, or a combination of the two. The logic for carrying out the methods discussed herein may be embodied as part of the system described in FIG. 10. The processes and systems described herein are not limited to the specific embodiments described, nor are they specifically limited to the specific processing order shown. Rather, any of the blocks of the processes may be re-ordered, combined, or removed, performed in parallel or in serial, as necessary, to achieve the results set forth herein.

Processor 1002 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs). In some embodiments, the "processor" may be embodied in one or more microprocessors with associated program memory. In some embodiments, the "processor" may be embodied in one or more discrete electronic circuits. The "processor" may be analog, digital, or mixed-signal. In some embodiments, the "processor" may be one or more physical processors or one or more "virtual" (e.g., remotely located or "cloud") processors.

Various functions of circuit elements may also be implemented as processing blocks in a software program. Such software may be employed in, for example, one or more digital signal processors, microcontrollers, or general-purpose computers. Described embodiments may be implemented in hardware, a combination of hardware and software, software, or software in execution by one or more physical or virtual processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid-state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general-purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

For example, when the program code is loaded into and executed by a machine, such as the computer of FIG. 10, the machine becomes an apparatus for practicing one or more of the described embodiments. When implemented on one or more general-purpose processors, the program code combines with such a processor to provide a unique apparatus that operates analogously to specific logic circuits. As such a general-purpose digital machine can be transformed into a special purpose digital machine. FIG. 10 shows Program Logic 1024 embodied on a computer-readable medium 1020 as shown, and wherein the Logic is encoded in computer-executable code configured for carrying out the reservation service process of this invention and thereby forming a Computer Program Product 1022. The logic may be the same logic on memory loaded on processor. The program logic may also be embodied in software modules, as modules, or as hardware modules. A processor may be a virtual processor or a physical processor. Logic may be distributed across several processors or virtual processors to execute the logic.

In some embodiments, a storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, a logic may be executed across one or more physical or virtual processors.

For purposes of illustrating the present embodiments, the disclosed embodiments are described as embodied in a specific configuration and using special logical arrangements, but one skilled in the art will appreciate that the device is not limited to the specific configuration but rather only by the claims included with this specification. In addition, it is expected that during the life of a patent maturing from this application, many relevant technologies will be developed, and the scopes of the corresponding terms are intended to include all such new technologies a priori.

The terms "comprises," "comprising", "includes", "including", "having" and their conjugates at least mean "including but not limited to". As used herein, the singular form "a," "an" and "the" includes plural references unless the context clearly dictates otherwise. Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

Throughout the present disclosure, absent a clear indication to the contrary from the context, it should be understood individual elements as described may be singular or plural in number. For example, the terms "circuit" and "circuitry" may include either a single component or a plurality of components, which are either active and/or passive and are connected or otherwise coupled together to provide the described function. Additionally, the term "signal" may refer to one or more currents, one or more voltages, and/or or a data signal. Within the drawings, like or related elements have like or related alpha, numeric or alphanumeric designators (e.g., a component labeled as "204" in FIG. 2 may be similar to a component labeled "404" in FIG. 4, etc.). Further, while the disclosed embodiments have been discussed in the context of implementations using discrete components, including some components that include one or more integrated circuit chips), the functions of any component or circuit may alternatively be implemented using one or more appropriately programmed processors, depending upon the signal frequencies or data rates to be processed and/or the functions being accomplished.

Similarly, in addition, in the Figures of this application, in some instances, a plurality of system elements may be shown as illustrative of a particular system element, and a single system element or may be shown as illustrative of a plurality of particular system elements. It should be understood that showing a plurality of a particular element is not intended to imply that a system or method implemented in accordance with the invention must comprise more than one of that element, nor is it intended by illustrating a single element that the invention is limited to embodiments having only a single one of that respective elements. In addition, the total number of elements shown for a particular system element is not intended to be limiting; those skilled in the art can recognize that the number of a particular system element can, in some instances, be selected to accommodate the particular user needs.

In describing and illustrating the embodiments herein, in the text and in the figures, specific terminology (e.g., language, phrases, product brands names, etc.) may be used for the sake of clarity. These names are provided by way of example only and are not limiting. The embodiments described herein are not limited to the specific terminology so selected, and each specific term at least includes all grammatical, literal, scientific, technical, and functional equivalents, as well as anything else that operates in a similar manner to accomplish a similar purpose. Furthermore, in the illustrations, Figures, and text, specific names may be given to specific features, elements, circuits, modules, tables, software modules, systems, etc. Such terminology used herein, however, is for the purpose of description and not limitation.

Although the embodiments included herein have been described and pictured in an advantageous form with a certain degree of particularity, it is understood that the present disclosure has been made only by way of example, and that numerous changes in the details of construction and combination and arrangement of parts may be made without departing from the spirit and scope of the described embodiments. Having described and illustrated at least some the principles of the technology with reference to specific implementations, it will be recognized that the technology and embodiments described herein can be implemented in many other, different, forms, and in many different environments. The technology and embodiments disclosed herein can be used in combination with other technologies. In addition, all publications and references cited herein are expressly incorporated herein by reference in their entirety.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the following claims.

What is claimed is:

1. A system, comprising:

a receiver configured to receive a plurality of scattered laser pulses, each respective scattered laser pulse in the plurality of scattered laser pulses associated with at least one respective dwell of a temporal series of respective dwells, each respective dwell separated in time from a nearest respective dwell in the temporal series of respective dwells by a random amount of time; and a processor configured for:

determining, by a first tracking detector, which scattered laser pulses of the plurality of scattered laser pulses are associated with photo events, tagging the scattered laser pulses associated with photo events, and corresponding range and range rate associated with one or more targets in the photo events and discarding scattered laser pulses not associated with photo events;

determining, by a second tracking detector and based on the tagged photo events, azimuth, azimuthal velocity, elevation, and elevation velocity of the one or more targets;

receiving dwell parameters including the range, azimuth, elevation, range velocity, azimuthal velocity, and elevation velocity;

projecting, for each dwell and based on the dwell parameters, respective tagged photo events of the respective dwells into a common reference frame that is an instantaneous reference frame of the one or more targets determined based on the dwell parameters, wherein the common reference frame is determined based on the dwell parameters, to generate a set of motion-compensated point clouds, the set of motion-compensated point clouds comprising at least one motion-compensated point cloud of the one or more targets for each of the tagged scattered laser pulses;

registering each respective motion-compensated point cloud, for each dwell, to other motion-compensated point clouds in the set of motion-compensated point clouds, to generate a set of registered point clouds; and merging the set of registered point clouds into a volumetric image of the one or more targets.

2. The system of claim 1, wherein the processor is further configured for:

computing, for the volumetric image, a local spatial point density; and applying a non-linear scaling to the local spatial point density to form a scaled volumetric image.

3. The system of claim 2, wherein the processor is further configured for displaying the scaled volumetric image.

4. The system of claim 1, wherein the plurality of dwells is noncontiguous in time.

5. The system of claim 1, wherein the range, azimuthal, and elevation velocity information is generated using a state space carving (SSC) process.

6. The system of claim 1, wherein the plurality of scattered pulses is associated with a single photon laser detection and ranging (LADAR) (SPL) system.

7. The system of claim 1, wherein the scattered laser pulses and detected photo events are associated with the one or more targets and wherein the common reference frame comprises an instantaneous reference frame that is associated with the one or more targets and which is based on the range velocity, the azimuthal velocity, and the elevation velocity.

8. The system of claim 7, wherein the target associated with the plurality of scattered laser pulses, has smoothly differentiable motion.

9. The system of claim 1 wherein the processor is configured for registering each respective motion-compensated point cloud to correct at least one of translation and orientation errors, in at least a portion of the set of motion-compensated point clouds.

10. The system of claim 1, wherein the processor is configured for registering each respective motion-compensated point cloud using an iterative closest point (ICP) algorithm.

11. A method, comprising:

receiving a plurality of scattered laser pulses, each respective scattered laser pulse in the plurality of scattered laser pulses associated with at least one dwell of a plurality of respective dwells of a temporal series of respective dwells, each respective dwell separated in time from a nearest respective dwell in the temporal series of respective dwells by a random amount of time;

determining, by a first tracking detector, which scattered laser pulses of the plurality of scattered laser pulses are associated with photo events, tagging the scattered laser pulses associated with photo events, and corresponding range and range rate associated with one or more targets in the photo events and discarding scattered laser pulses not associated with photo events;

determining, by a second tracking detector and based on the tagged photo events, azimuth, azimuthal velocity, elevation, and elevation velocity of the one or more targets;

receiving dwell parameters including the range, azimuth, elevation, range velocity, azimuthal velocity, and elevation velocity;

projecting, for each dwell and based on the dwell parameters, respective tagged photo events of the respective dwells into a common reference frame that is an instantaneous reference frame of the one or more targets as determined based on the dwell parameters, wherein the common reference frame is determined based on the dwell parameters, to generate a set of motion-compensated point clouds, the set of motion-compensated point clouds comprising at least one motion-compensated point cloud of the one or more targets for each of the tagged scattered laser pulses;

registering each respective motion-compensated point cloud, for each dwell, to other motion-compensated point clouds in the set of motion-compensated point clouds, to generate a set of registered point clouds; and merging the set of registered point clouds into a volumetric image of the one or more targets.

12. The method of claim 11, further comprising displaying the volumetric image as a scaled volumetric image.

13. The method of claim 11, further comprising generating the range velocity, the azimuthal velocity, and the elevation velocity using a state space carving (SSC) process.

14. The method of claim 11, wherein the registering each respective motion-compensated point cloud is configured to correct at least one of translation and orientation errors, in at least a portion of the set of motion-compensated point clouds.

15. A means for laser detection, comprising:

means for receiving a plurality of scattered laser pulses, each respective scattered laser pulse in the plurality of scattered laser pulses associated with at least one dwell of a plurality of respective dwells of a temporal series of respective dwells, each respective dwell separated in time from a nearest respective dwell in the temporal series of respective dwells by a random amount of time;

means for determining which scattered laser pulses of the plurality of scattered laser pulses are associated with photo events, tagging the scattered laser pulses associated with photo events, and corresponding range and range rate associated with one or more targets in the photo events and discarding scattered laser pulses not associated with photo events;

means for determining, based on the tagged photo events, azimuth, azimuthal velocity, elevation, and elevation velocity of the one or more targets;

means for receiving dwell parameters including the range, azimuth, elevation, range velocity, azimuthal velocity, and elevation velocity;

means for projecting, for each dwell and based on the dwell parameters, respective tagged photo events for the respective dwells into a common reference frame that is an instantaneous reference frame of the one or more targets as determined by the dwell parameters, wherein the common reference frame is determined based on the dwell parameters, to generate a set of motion-compensated point clouds, the set of motion-compensated point clouds comprising at least one motion-compensated point cloud for of the one or more targets for each of the tagged scattered laser pulses;

means for registering each respective motion-compensated point cloud, for each dwell, to other motion-compensated point clouds in the set of motion-compensated point clouds, to generate a set of registered point clouds; and means for merging the set of registered point clouds into a volumetric image of the one or more targets.

16. The means for laser detection of claim 15 further comprising means for generating the range velocity, azimuthal velocity, and elevation velocity using a state space carving (SSC) process.

17. The means for laser detection of claim 15, wherein the registering each respective motion-compensated point cloud is configured to correct at least one of translation and orientation errors, in at least a portion of the set of motion-compensated point clouds.

* * * * *